(12) United States Patent
Tamaoki et al.

(10) Patent No.: US 8,548,787 B2
(45) Date of Patent: Oct. 1, 2013

(54) SIMULATING A CHEMICAL REACTION PHENOMENON IN A SEMICONDUCTOR PROCESS

(75) Inventors: Naoki Tamaoki, Minato-ku (JP); Akio Ui, Minato-ku (JP); Toshiro Takase, Minato-ku (JP); Takashi Ichikawa, Minato-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1563 days.

(21) Appl. No.: 11/556,828

(22) Filed: Nov. 6, 2006

(65) Prior Publication Data

US 2007/0118341 A1 May 24, 2007

(30) Foreign Application Priority Data

Nov. 24, 2005 (JP) .................................. 2005-339299

(51) Int. Cl.
*G06G 7/58* (2006.01)
(52) U.S. Cl.
USPC ........... 703/12; 703/1; 703/2; 703/6; 438/706
(58) Field of Classification Search
USPC .................. 703/1, 2, 12; 204/298.01, 298.04
See application file for complete search history.

(56) References Cited

U.S. PATENT DOCUMENTS 6,199,029 B1 * 3/2001 Ohta ................................. 703/1
6,804,572 B1 * 10/2004 Cooperberg et al. ......... 700/121

FOREIGN PATENT DOCUMENTS

| JP | 8-106449 | 4/1996 |
| JP | 2004-241787 | 8/2004 |
| JP | 2004-266098 | 9/2004 |

OTHER PUBLICATIONS

Rodgers et al, "Multiscale modeling of chemical vapor deposition", Jan. 1998, Journal of Applied Physics, 83, pp. 524-530.*
Yasunobu Akiyama, et al., "Macro- and micro-scale simulation of growth rate and composition in MOCVD of yttria-stabilized zirconia", N.H Elsevier, Journal of Crystal Growth, 241, Nov. 18, 2002, pp. 352-362.
Carlo Cavallotti, et ai., "A multiscale study of the selective MOVPE of $Al_xGa_{1-x}As$ in the presence of HCI", N.H Elsevier, Journal of Crystal Growth, 248, 2003, pp. 411-416.
Office Action issued Jan. 25, 2011, in Japan Patent Application No. 2005-339299 (with English-language Translation).

* cited by examiner

*Primary Examiner* — Kamini S Shah
*Assistant Examiner* — Jay B Hann
(74) *Attorney, Agent, or Firm* — Oblon, Spivak, McClelland, Maier & Neustadt, L.L.P.

(57) ABSTRACT

A calculating unit calculates either one of a reaction probability between a chemical species used in a semiconductor process and a semiconductor device and a deactivation probability of the chemical species, according to either one of a structure of the semiconductor device and a plurality of materials. A simulation unit performs a simulation of a physical phenomenon occurring in a reaction chamber based on either one of the reaction probability and the deactivation probability.

9 Claims, 20 Drawing Sheets

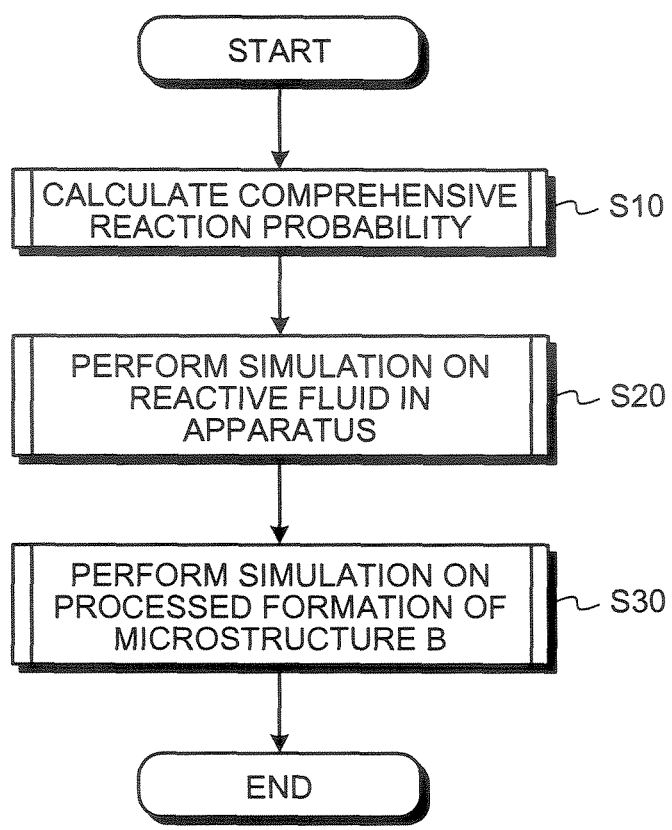

FIG.8
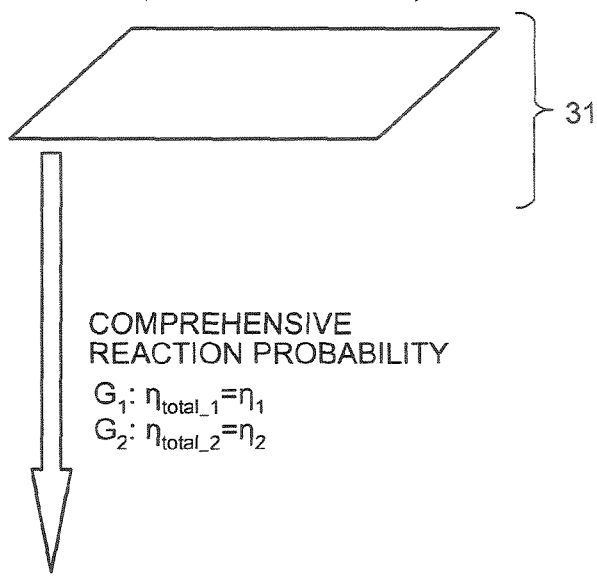
(FLAT STRUCTURE)
31
COMPREHENSIVE
REACTION PROBABILITY
$G_1: \eta_{total\_1} = \eta_1$
$G_2: \eta_{total\_2} = \eta_2$
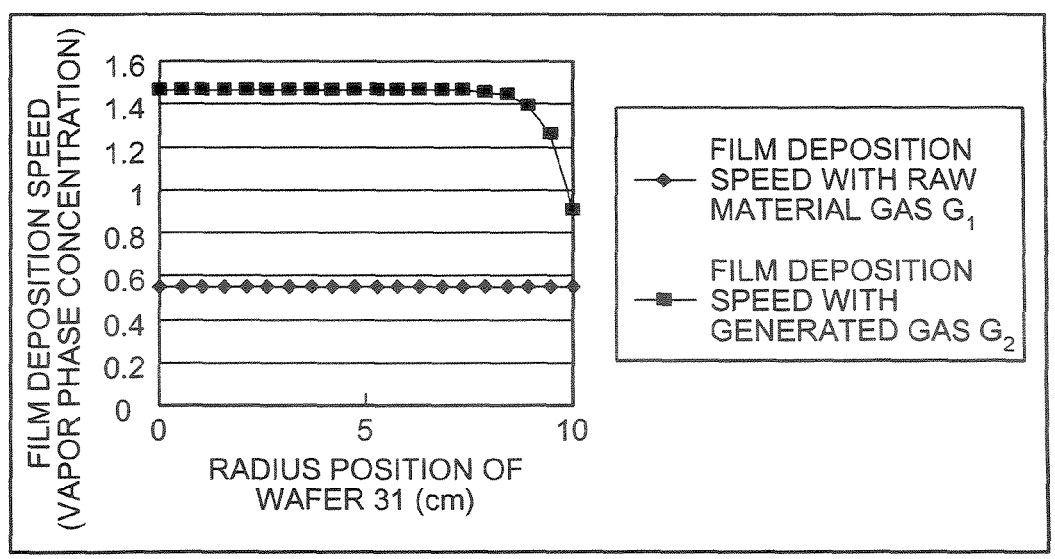

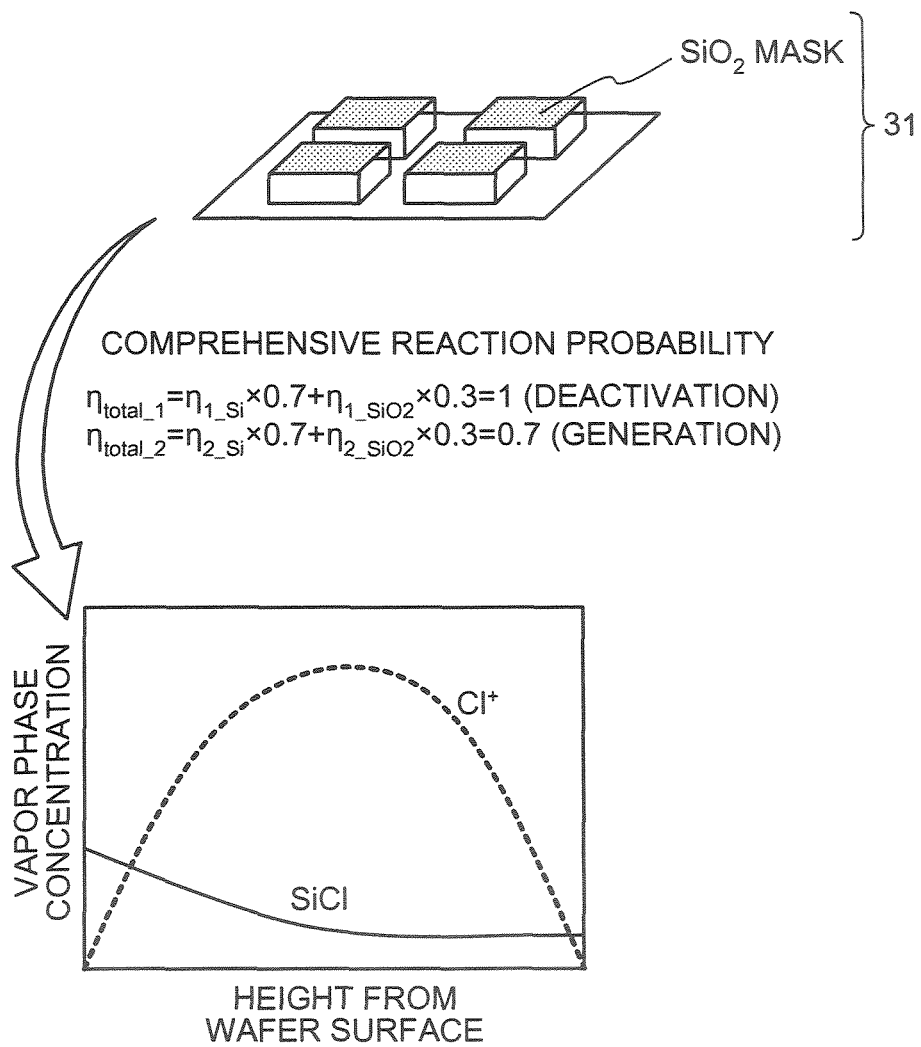

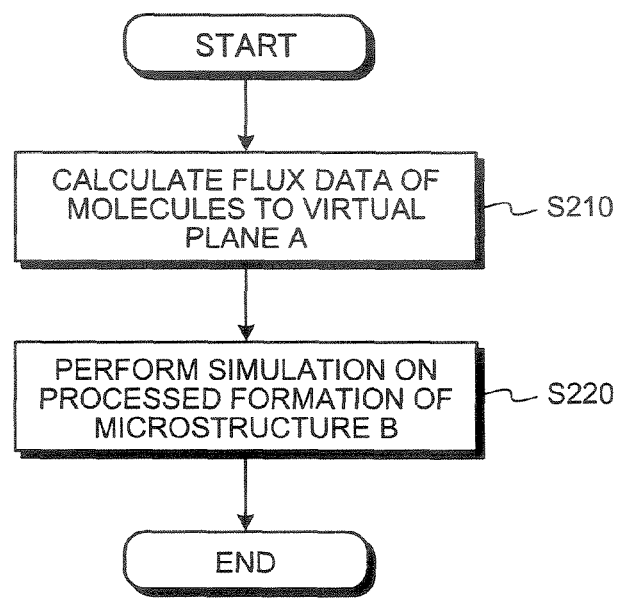
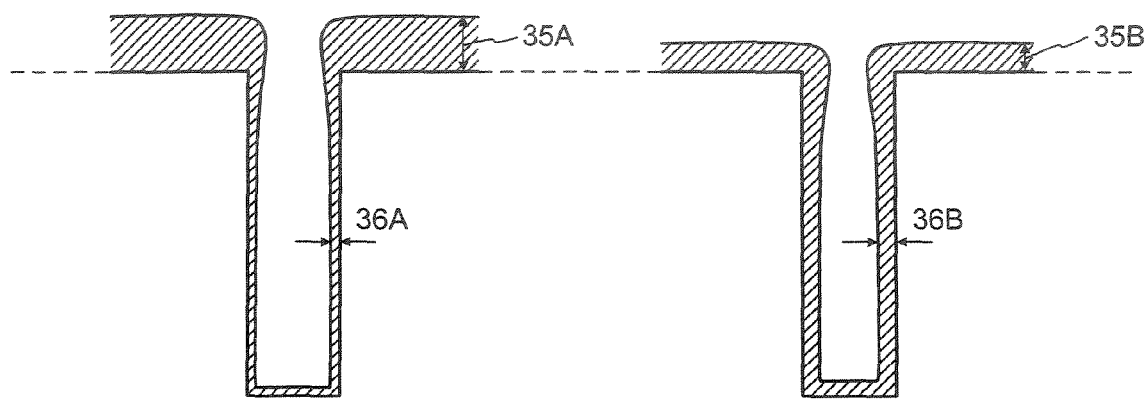

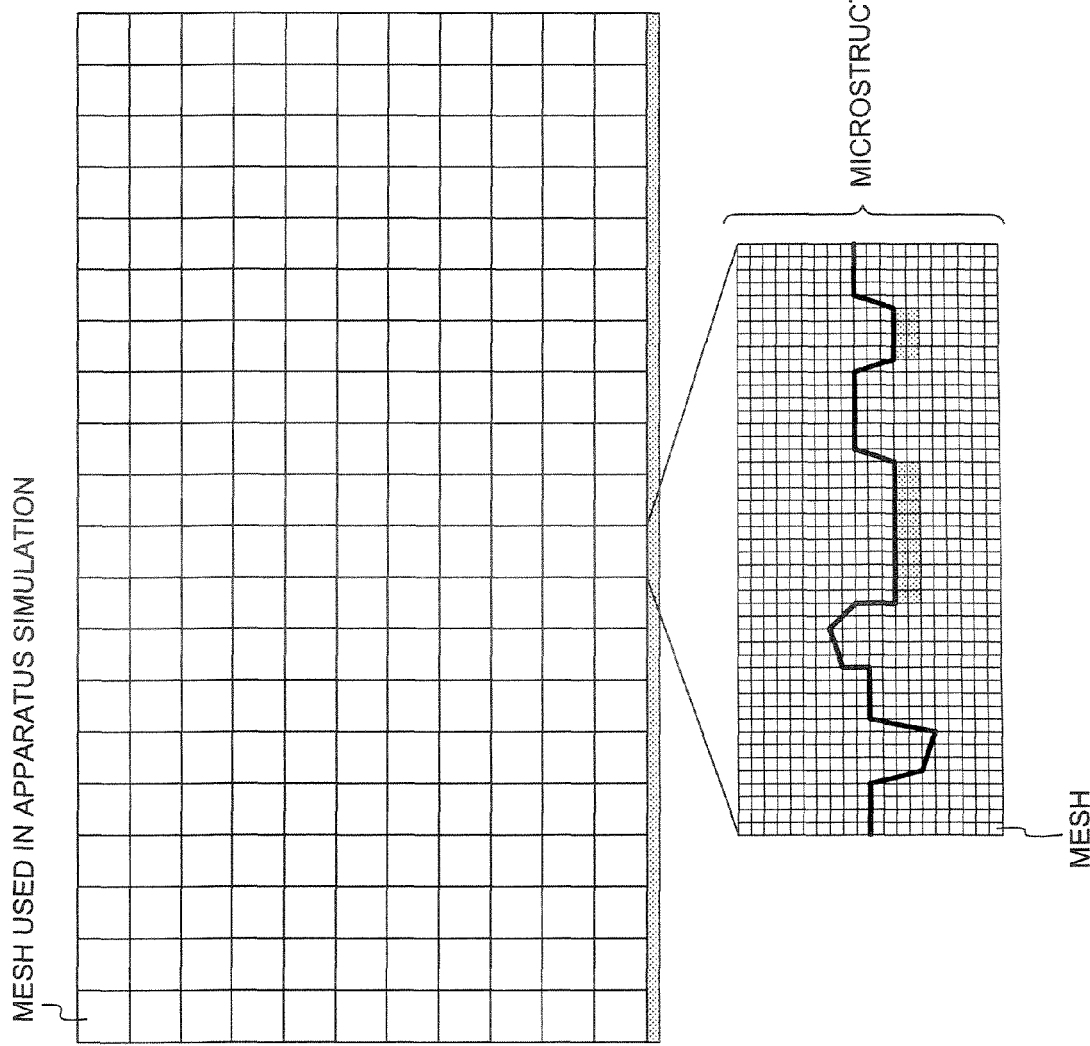

SIMULATING A CHEMICAL REACTION PHENOMENON IN A SEMICONDUCTOR PROCESS

CROSS-REFERENCE TO RELATED APPLICATIONS

This application is based upon and claims the benefit of priority from the prior Japanese Patent Application No. 2005-339299, filed on Nov. 24, 2005; the entire contents of which are incorporated herein by reference.

BACKGROUND OF THE INVENTION

1. Field of the Invention

The present invention relates to a simulation apparatus, a simulation method, and a computer program product for performing a simulation of a reaction phenomenon in a semiconductor process.

2. Description of the Related Art

With a semiconductor process apparatus using a chemical vapor deposition method, reactive ion etching, or the like, to analyze the phenomenon in the reaction chamber and perform a simulation using a computer is a technique that is essential to the achievement of process control at a high level. Thus, in a manufacturing process of a semiconductor product, which requires extremely a fine processing, the process needs to be controlled with a high degree of precision, and the simulation needs to be performed with a high degree of precision.

In a reaction chamber in a process apparatus, various phenomena are intricately involved with one another, including the transport of heat and fluids, a plasma physical phenomenon caused by electron excitation, influences from external electric fields and magnetic fields, and chemical reactions caused by ion bombardments and thermal energy. Thus, although today's computer environment is advanced, it takes a long time and also it is not easy to calculate these phenomena accurately.

Further, the chemical reactions on the wall surfaces of the reaction chamber and on the surface of the semiconductor substrate sometimes have a strong influence, as boundary conditions, on the phenomena occurring in the reaction chamber. Also, the magnitude of the influence of the reactions occurring on the surface of the semiconductor substrate exerted on a vapor phase phenomenon in the reaction chamber depends on not only numerical values, which can be defined using chemical reaction expressions, but also factors related to the microstructure including the material of which the surface is made.

For example, let us discuss a situation in which a chemical reaction vapor deposition method utilizing thermal energy (i.e. a thermal Chemical Vapor Deposition (CVD) method) is used, and the supplied source gases have a decomposition reaction on the surface of a semiconductor substrate and is deposited. In this situation, the reactivity of the source gases are often low. For example, statistically speaking, there is a possibility that, of $10^5$ vapor phase molecules that collide against the surface of the semiconductor substrate, only one molecule actually has a reaction on the surface and is deposited as a film (the reaction probability is expressed as $10^{-5}$). In this situation, the deposition rate of the film on the surface of the substrate is substantially the same, regardless of whether the substrate surface is a smooth plane (i.e. a plane structure) or the substrate surface is a surface with an uneven profile (i.e. an uneven structure). For example, if an area having an uneven structure is ten times larger than an area having a plane structure, the consumption speed of the vapor phase molecules with the uneven structure is ten times larger than the consumption speed with the plane structure.

However, even if the surface profile is the same, when molecules that have a high reactivity and have the reaction probability of 1 form a deposition film, the deposition speed of the film at an internal portion of the uneven profile (i.e. the inner wall portion) is lower than the deposition speed on the plane (i.e. the upper surface portion). Consequently, the consumption speed of the vapor phase molecules is the same, regardless of whether the substrate has a plane structure or an uneven structure.

Also, in a Reactive Ion Etching (RIE) process to perform an etching process with high-speed ions that are highly anisotropic, the surface of a solid is etched by the ions, and the etching products are released as gas molecules. It is known that the released etching product molecules may be re-deposited on the surface. The amount of the re-deposited molecules has a strong influence on a processed-profile in the reactive ion etching process. For example, when an etching process is performed on a substrate over an etching mask that has a low reactivity with ions, and if the ion anglar distribution is very highly anisotropic, the ions collide against substantially the mask substance and cause no reaction. Thus, there is hardly any product generated in the etching process. However, when the ions are less anisotropic, many reactive ions collide against even the side-wall surfaces on which there is no mask. Accordingly, the side-wall surfaces are etched, and a lot of etching products are released.

As described above, in a semiconductor process apparatus, the phenomena occurring in the reaction chamber are strongly linked to the microstructure on the wall surface of the reaction chamber or on the semiconductor substrate. Thus, to perform a simulation with a high degree of precision, it is necessary to take into consideration the mutual interactions between the vapor phase and the surface.

However, although semiconductor process apparatuses have a size of some centimeters to meter order, the surface structure of a semiconductor substrate is often a microstructure from micrometers to nanometers. Thus, the mesh sizes used in the numerical value calculations to perform calculations efficiently are mutually different between the semiconductor apparatus and the surface structure. Thus, it is difficult to perform numerical simulations at the same time on the phenomena related to the semiconductor apparatus and the phenomena related to the surface structure. For this reason, in conventional semiconductor process simulations, the calculations are often performed by simply assuming that the surface of a semiconductor substrate is a plane surface, which means that the microstructure on the surface is ignored, or by only taking into consideration macro area-size ratios of a plurality of surfaces that are made of mutually different materials (Y. Akiyama et al., J. Crystal Growth 241 (2002) 352.).

In the simulation disclosed in Carlo Cavallotti et al., J. Crystal Growth 248 (2003) 411, a simulation 1 in which a calculation is performed for a process reaction chamber, using a relatively larger calculation mesh, and a simulation 2 in which a calculation is performed for a specific microstructure on the surface, using a very small calculation mesh are performed According to the method, it is proposed that convergence calculations are performed repeatedly so that, in a boundary region, the concentrations of the vapor phase reactive molecules and the concentration gradients become the same in the simulation 1 and the simulation 2.

Further, Japanese Patent Application Laid-open No. H8-106449 discloses a simulation method for an interactive reaction between a solid phase base and vapor phase particles being incident to the solid phase by which the attribute of a particle in the solid phase base is determined (e.g. an attribute of Si or an attribute of O) so that the behavior is determined according to the base particle to which a vapor phase particle has adhered.

However, a problem remains with the simulation method disclosed in Y. Akiyama et al., J. Crystal Growth 241 (2002) 352, where it is not possible to perform a simulation accurately, while a mutual interaction between the microstructure on the surface of the semiconductor substrate and the vapor phase is taken into consideration.

In addition, although the simulation method disclosed in Carlo Cavallotti et al., J. Crystal Growth 248 (2003) 411 is a physically accurate approach, a problem remains where it takes a long time to perform the calculation when complicated chemical reactions and plasma phenomena are dealt with.

Also, as for the simulation method disclosed in Japanese Patent Application Laid-open No. H8-106449, a problem remains where it is not possible to apply the method to an apparatus simulation for a semiconductor process apparatus that has a larger scale than the surface structure of the semiconductor substrate.

SUMMARY OF THE INVENTION

A simulation apparatus according to one aspect of the present invention includes a calculating unit that calculates either one of a reaction probability between a chemical species and a semiconductor device and a deactivation probability of the chemical species, according to either one of a structure of the semiconductor device and a plurality of materials; and a simulation unit that performs a simulation of a physical phenomenon occurring in a reaction chamber based on either one of the reaction probability and the deactivation probability.

A computer program product according to another aspect of the present invention includes a computer usable medium having computer readable program codes embodied in the medium that when executed causes a computer to execute calculating either one of a reaction probability between a chemical species and a semiconductor device and a deactivation probability of the chemical species, according to either one of a structure of the semiconductor device and a plurality of materials; and performing a simulation of a physical phenomenon occurring in a reaction chamber based on either one of the reaction probability and the deactivation probability.

A simulation method according to still another aspect of the present invention includes calculating either one of a reaction probability between a chemical species and a semiconductor device and a deactivation probability of the chemical species, according to either one of a structure of the semiconductor device and a plurality of materials; and performing a simulation of a physical phenomenon occurring in a reaction chamber based on either one of the reaction probability and the deactivation probability.

BRIEF DESCRIPTION OF THE DRAWINGS

FIG. 2 is a flowchart of a processing procedure of an operation performed by the simulation apparatus according to the first embodiment;

FIG. 8 is a drawing for explaining a film deposition speed in a film deposition apparatus with a wafer having a flat structure;

FIG. 13 is a drawing for explaining a vapor phase concentration in a plasma etching apparatus with a wafer the surface of which is covered by a $SiO_2$ mask;

FIG. 14 is a flowchart of a procedure in a profile simulation performed on a processed-profile of a microstructure;

FIG. 15 is a drawing of an example of a result of a simulation performed on a processed-profile in a film deposition apparatus;

FIG. 16 is a drawing of an example of a result of a simulation performed on a processed-profile in a plasma etching apparatus;

FIG. 17 is a drawing for explaining a relationship between the size of an area for which a comprehensive reaction probability is calculated and the mesh size that is used when an apparatus simulation is performed;

DETAILED DESCRIPTION OF THE INVENTION

Figure 1:
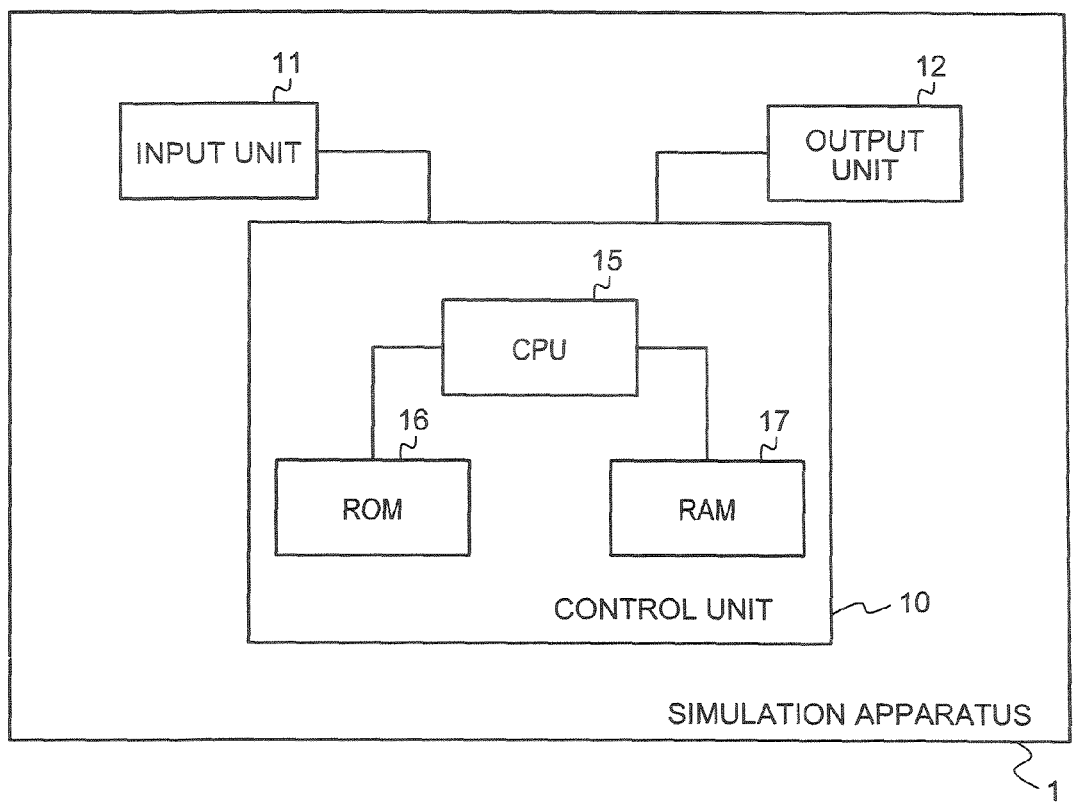
FIG. 1 is a block diagram of a simulation apparatus according to a first embodiment of the present invention.

Exemplary embodiments of the present invention will be explained below in detail with reference to the accompanying drawings. The present invention is not limited to these exemplary embodiments.

According to a first embodiment of the present invention, a simulation (i.e. a calculation) is performed on a phenomenon (i.e. a semiconductor process) in an interior atmosphere (i.e. a larger system) within a semiconductor manufacturing apparatus (i.e. a reaction chamber) and a processed-profile of a device (i.e. a smaller system), while taking into consideration the influence of the device (i.e. a fine surface structure) that has a very different scale from the semiconductor manufacturing apparatus.

More specifically, according to the simulation method of the present invention, when a semiconductor process simulation is performed, to calculate a concentration distribution and fluxes of a chemical species (i.e. a reaction target substance; vapor phase molecules, ions, or the like) within a semiconductor manufacturing apparatus, the influence of the microstructures on an inner wall of the reaction chamber in the semiconductor manufacturing apparatus and on the semiconductor substrate are efficiently taken into account. As a boundary condition in an apparatus simulation, a reaction probability that is comprehensive (hereinafter, a "comprehensive reaction probability") in which the influence of the microstructure on the surface is taken into consideration will be used. In this situation, it is assumed that the comprehensive reaction probability does not depend on the absolute value of the concentration of the chemical species. This assumption is valid in many situations with semiconductor processes including a film deposition processing and an etching processing. In the explanation below, a simulation for the inside of a reaction chamber within a semiconductor manufacturing apparatus will be referred to as an apparatus simulation, whereas a simulation for a processed-profile in a fine device structure will be referred to as a profile simulation.

Also, by using fluxes of various chemical species being incident to a flat surface and a result of a calculation of fluxes including an anglar distribution of anisotropic ions that have been obtained in such an apparatus simulation, a processed-profile in a fine device structure is speculated (i.e. a profile simulation is performed). For example, in a reactive ion etching process, because the etching products re-adhere to the surface, the processed-profile sometimes strongly depends on the etching amount. The amount of the etching products strongly depends on the surface microstructure of the device, including the surface area of the mask material. Thus, in the profile simulation with an etching process, it is effective to take into consideration the influence of the surface microstructure exerted on the concentration distribution of the chemical species inside the process apparatus, by using a comprehensive reaction probability. In this situation, the fluxes denotes the fluxes of molecules (or ions or atoms) being incident to a predetermined surface.

As shown in FIG. 1, a simulation apparatus 1 includes an input unit 11, an output unit 12, and a control unit 10 and has a hardware configuration in which a common computer is used.

The input unit 11 is configured to include a mouse, a keyboard, and the like. The input unit 11 inputs inprofile used for performing the various types of simulations, including inprofile related to various calculation expressions, inprofile related to experiment values and speculated values, inprofile related to the microstructure of the device, inprofile related to the fluxes, instruction inprofile (i.e. inprofile related to conditions and procedures) for performing various types of process simulations.

The output unit 12 is configured to include a display unit such as a liquid crystal display monitor. The output unit 12 outputs (i.e. displays) calculation results (i.e. simulation results) of the various types of simulations obtained by the control unit 10.

The control unit 10 is configured to include a controlling device such as a Central Processing Unit (CPU) 15, storage devices such as a Read Only Memory (ROM) 16 and a Random Access Memory (RAM) 17. The control unit 10 controls the input unit 11 and the output unit and also performs the various types of simulations. When predetermined instruction inprofile is input by a user of the simulation apparatus 1 (hereinafter, the "user") via the input unit 11, the CPU 15 reads one of various types of simulation programs that are used for performing the various types of simulations and are stored in the ROM 16, unfolds the read simulation program into a program storage area within the RAM 17, and performs one of the various types of processing including apparatus simulations and profile simulations. Various types of data (i.e. the simulation results) generated as a result of the processing are stored into a data storage area provided within the RAM 17.

The various types of simulation programs that are used for performing the various types of simulations and are stored in the ROM 16 include a program for performing a simulation (i.e. an apparatus simulation) on a reactive fluid in a reaction chamber within a semiconductor manufacturing apparatus based on a comprehensive reaction probability, a program for performing a simulation (i.e. a profile simulation) related to a processed-profile of a semiconductor device, using inprofile related to a reactive fluid in a reaction chamber, a program for extracting a calculation mesh size used for performing each of the various types of simulations, and a program for calculating, for example, an area size ratio for each of semiconductor device areas in which the various types of simulations are performed. Thus, the control unit 10 has various types of simulation functions that correspond to these various types of simulation programs.

The processing procedure of an operation performed by the simulation apparatus 1 according to the first embodiment will be explained. In this example, to perform a profile simulation on a processed-profile of a semiconductor device, a surface reaction inside a microstructure and fluxes will be calculated in detail. In the calculation of the fluxes in this example, for example, an extremely small area including a microstructure is used as a calculation area, and molecules are incident from a position above the calculation area, so that collisions, reflections, and reactions of the molecules are tracked. In this situation, the position above the calculation area is considered to be a virtual plane (i.e. a virtual plane A, which is described later). The number of molecules incident from the position above the calculation area are counted as the number of molecules passing from above, whereas the number of molecules going out of the calculation area are counted as the number of molecules passing from below. With this method, it is possible to easily obtain a comprehensive reaction probability by performing a numerical calculation.

For example, in the calculation of the fluxes to obtain the comprehensive reaction probability, when the area of the surface microstructure used in the calculation is assumed to have a size equal to the mesh size used in an apparatus simulation, it is possible to use, as it is, a comprehensive reaction probability calculated as a boundary condition in the apparatus simulation. Accordingly, to perform the profile simulation on the processed-profile of the semiconductor device, firstly, the comprehensive reaction probability is calculated, based on the flux calculation in which a profile calculation tool is used. Secondly, an apparatus simulation is performed on the reaction chamber and the like, so that the fluxes that are necessary in the calculation of the fine processed-profile is calculated. With this method, it is not necessary to develop a new calculation tool in particular. It is possible to have the influence of the surface accurately reflected on the calculation result only by devising the way of using the existing calculation tool.

The comprehensive reaction probability that is used in the apparatus simulation in this example may be the values calculated on some points on the surface inside the apparatus or may be an average of the values obtained from the entire surface inside the apparatus. When an apparatus simulation having a high calculation load such as a plasma simulation is performed, the calculation is sometimes performed while the spatial resolution level is decreased. In such a situation, it is desirable to use a comprehensive reaction probability obtained by averaging the values in a large spatial area.

The processing procedure of an operation performed by the simulation apparatus will be explained more specifically, with reference to a flowchart shown in FIG. 2. The simulation apparatus 1 calculates a comprehensive reaction probability that corresponds to the surface structure (i.e. a microstructure B, which is described later) of a substrate (i.e. a substrate 30, which is described later) on which the various types of simulations are performed (step S10). The comprehensive reaction probability in this situation is a reaction probability calculated while the influence of the surface structure of the substrate (i.e. the microstructure B of the substrate 30) is taken into account and is different from a normal reaction probability that is calculated while the surface structure of the substrate is ignored.

The simulation apparatus 1 performs a simulation on the reactive fluid in the apparatus (i.e. an apparatus simulation) (step S20). In this apparatus simulation, a simulation is performed on the physical phenomena occurring in the reaction chamber by using, as a boundary condition of the apparatus simulation, the comprehensive reaction probability calculated in correspondence with the surface structure of the substrate 30 (i.e. a wafer 31, which is described later). In other words, the apparatus simulation is performed by using a virtual plane positioned near the actual surface as an interface. As a result, it is possible to obtain a simulation result of the reactive fluid inside the apparatus (i.e. a value of a physical phenomenon inside the reaction chamber; for example, a vapor phase concentration). In this situation, the vapor phase concentration denotes inprofile related to the concentration of chemical species, i.e. the concentration inprofile.

The simulation apparatus 1 performs a simulation (i.e. a profile simulation) on the processed-profile of the microstructure B, by using the result of the apparatus simulation performed on the reactive fluid, such as the vapor phase concentration, that has been obtained at step S20 (step S30). As a result, it is possible to obtain the processed-profile that corresponds to an initial profile of the microstructure B (i.e. a simulation result related to the processed-profile of the fine device).

Figure 3A:
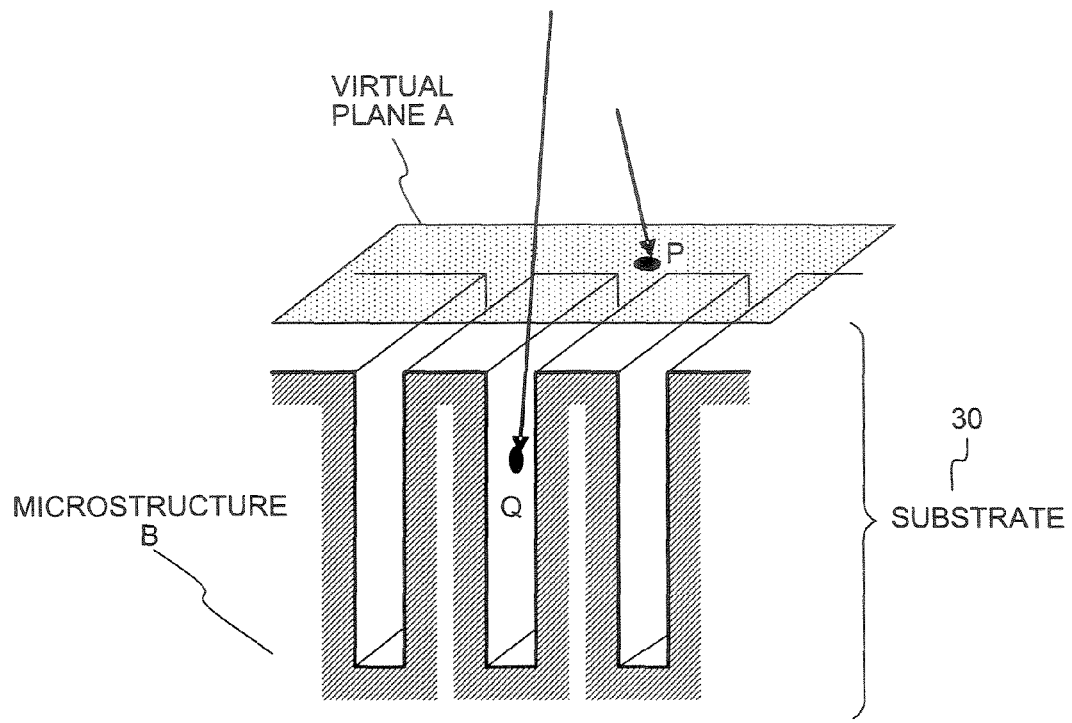
FIG. 3A is a first drawing for explaining a method for calculating a comprehensive reaction probability.
Figure 3B:
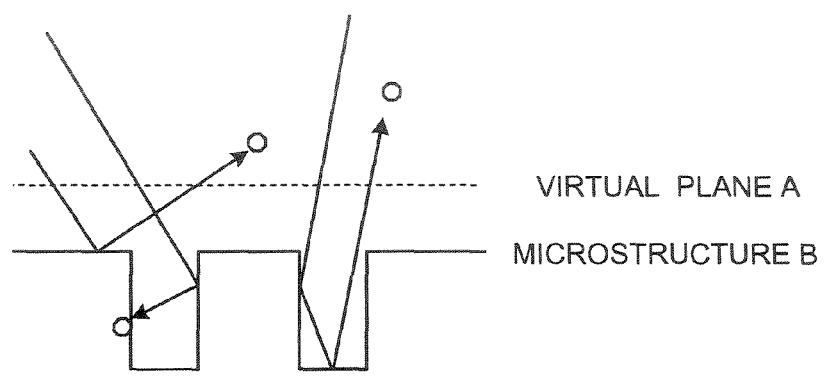
FIG. 3B is second drawing for explaining the method for calculating a comprehensive reaction probability.
Figure 4:
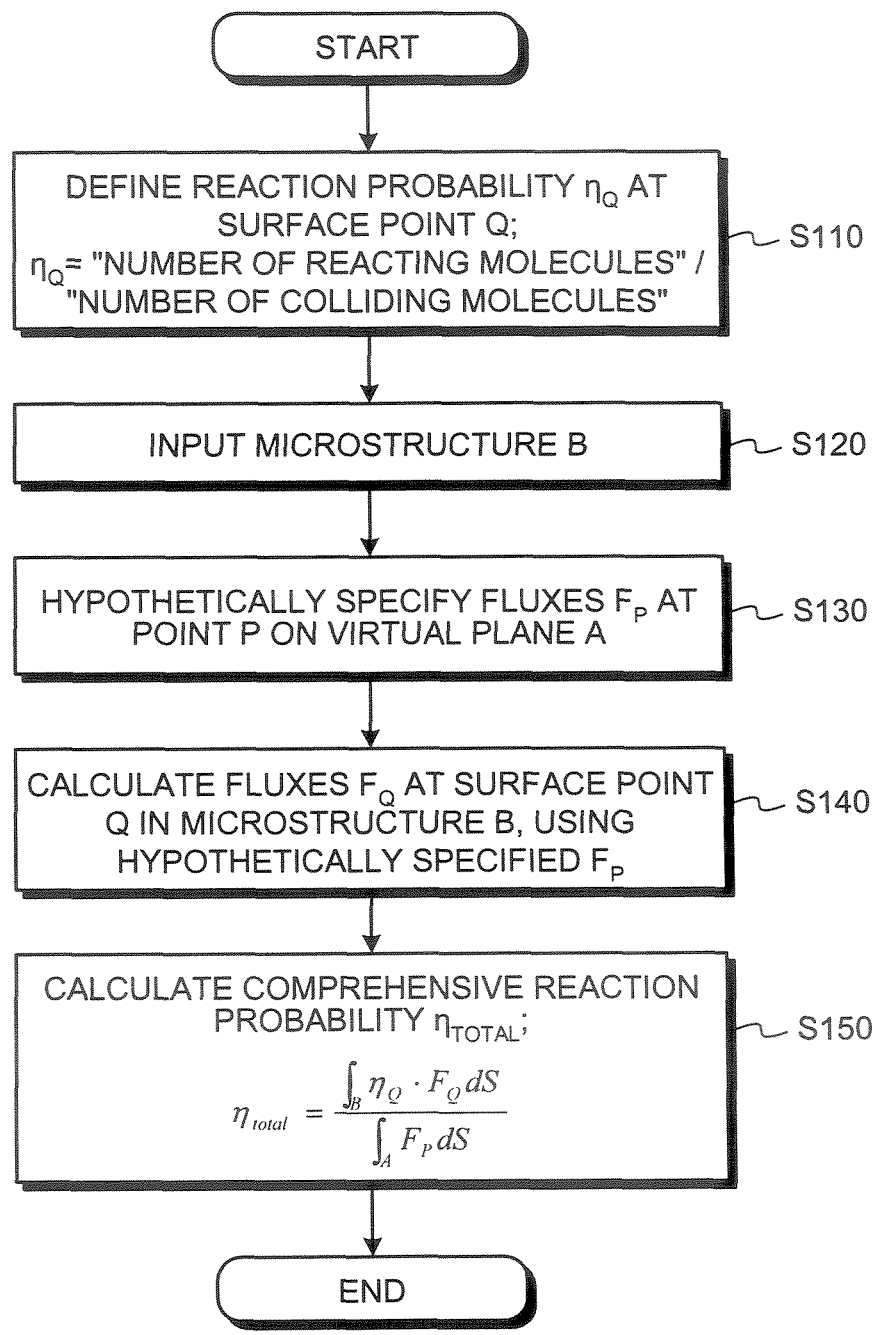
FIG. 4 is a flowchart of a procedure for calculating the comprehensive reaction probability.

The processing at step S10 through step S30 will be explained in detail. First, as a part of the processing procedure of the operation performed by the simulation apparatus 1, the comprehensive reaction probability that corresponds to the surface structure of the substrate 30 on which the various types of simulations are performed will be explained in detail. As shown in FIG. 3A and FIG. 3B, in this example, the control unit 10 calculates the comprehensive reaction probability for the microstructure B included in the substrate 30. In this example, to calculate the comprehensive reaction probability, an example in which a chemical species collide against the surface of the substrate and has a film deposition reaction is used as an example of a reaction.

A reaction probability $\eta_Q$ at a predetermined point (hereinafter, the surface point Q) within the microstructure B of the substrate 30 is defined. The reaction probability $\eta_Q$ may be input by the user via the input unit 11. Alternatively, the reaction probability $\eta_Q$ may be input to the ROM 16 included in the control unit 10 in advance, to be extracted from the ROM 16 by the CPU 15.

The reaction probability $\eta_Q$ in this example can be defined as "the number of particles of the reacting chemical species"/ "the number of particles of the colliding chemical species", for example "the number of reacting molecules"/"the number of colliding molecules" (step S110). The number of reacting molecules and the number of colliding molecules may be values calculated based on values obtained in an experiment or may be speculated values.

Inprofile related to the microstructure B on which the various types of simulations are performed is input to the control unit 10 via the input unit 11 (Step S120). The inprofile related to the microstructure B includes, for example, inprofile indicating the range or the profile of the microstructure B with coordinates.

In this situation, the control unit 10 specifies a virtual plane A at a position a little above the actual surface (i.e. the upper surface of the microstructure B). The distance between the virtual plane A and the actual surface is arranged to be shorter than the mean free path of the molecules or the like on which the simulation (i.e. the calculation of the comprehensive reaction probability) is performed.

Figure 5:
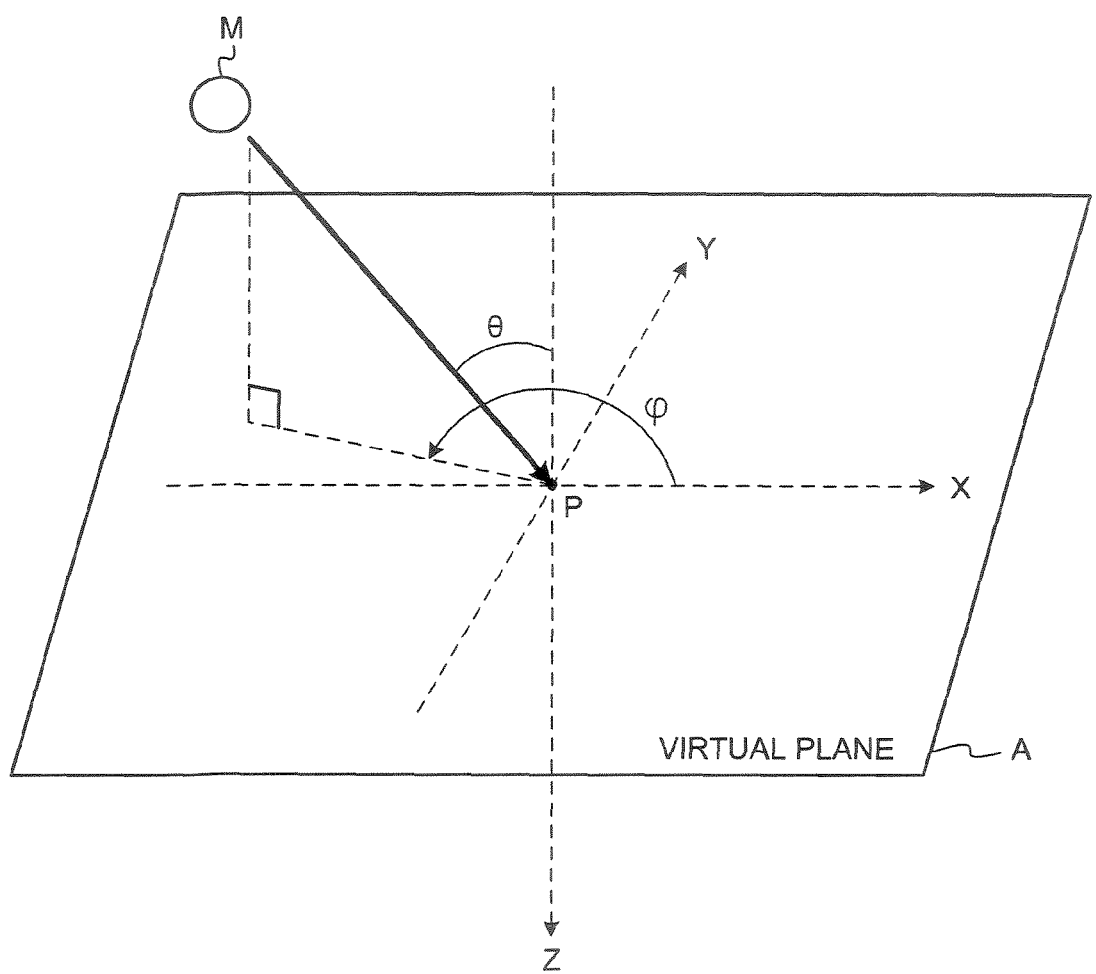
FIG. 5 is a drawing for explaining an example of hypothetically specifying fluxes.

The control unit 10 hypothetically specifies fluxes $F_P$ at a virtual point P on the virtual plane A (step S130). The fluxes $F_P$ may be a predetermined value (for example "1"), or may be a predetermined expression. An example in which the fluxes $F_P$ is hypothetically specified using a predetermined expression will be explained. As shown in FIG. 5, an example is shown in which the fluxes $F_P$ that are hypothetically specified are isotropic, which means that the molecule M on which the simulation (i.e. the calculation of the comprehensive reaction probability) is performed comes flying in the same manner from any direction.

The angle between an incident direction vector of the molecule M and the Z-axis will be expressed as $\theta$. The angle between a projection vector obtained by projecting the incident direction vector of the molecule M onto the XY plane (the virtual plane A) and the X-axis will be expressed as $\phi$. In this situation, the fluxes $F_P$ is expressed using an expression, for example, $F_P(\theta, \phi) = F_0 \cos \theta$.

After the fluxes $F_P$ are hypothetically specified as a result of the processing performed at step S130, the control unit 10 calculates the fluxes $F_Q$ at the surface point Q in the microstructure B, using the hypothetically specified fluxes $F_P$ (Step S140).

The control unit 10 calculates a comprehensive reaction probability $H_1$ based on the virtual plane A, the microstructure B, the reaction probability $\eta_Q$ at the surface point Q, the fluxes $F_P$, and the fluxes $F_Q$ (step S150). The comprehensive reaction probability $H_1$ in this situation can be calculated by $$H_1 = \frac{\oint\int_B R_Q dS_B}{\oint\int_A F_{Pu} dS_A} = \frac{\oint\int_B \eta_Q \cdot F_Q dS_B}{\oint\int_A F_{Pu} dS_A} \qquad (1)$$

In Equation (1), the comprehensive reaction probability $H_1$ is calculated, using the fluxes passing the virtual plane A from above that are expressed as fluxes $F_{pu}$ (mol/m$^2$/sec) and the fluxes (i.e. the molecule fluxes) reacting on the surface of the microstructure B that are expressed as $R_Q$ (mol/m$^2$sec). In this example, the comprehensive reaction probability $H_1$ is calculated as an average value of reaction probabilities, which is calculated by counting the number of fluxes reacting on the surface of the microstructure B with respect to the fluxes being incident and integrating the ratio of reacting fluxes with respect to the entire area of the microstructure B.

Alternatively, the comprehensive reaction probability may be calculated using Equation (2) shown below. In Equation (2), the ratio of the fluxes being incident to the virtual plane A from below to the fluxes being incident to the virtual plane A from above is integrated with respect to the area so that an average value of the reaction probabilities from the microstructure B is calculated, and thereby a comprehensive reaction probability $H_2$ is calculated. For example, when the reaction probability $\eta_Q$ is zero, the fluxes being incident to the virtual plane A from above is equal to the fluxes being incident from below. On the other hand, when the reaction probability $\eta_Q$ is larger than zero, the molecules that have been deposited as a film on the surface (i.e. the microstructure B) do not come back. Thus, the fluxes being incident to the virtual plane A from below become fewer. In other words, when the reaction probability $\eta_Q$ is larger than zero, the total number of fluxes being incident to the virtual plane A in a unit time is larger than the total number of fluxes being released from the virtual plane A in the unit time. Thus, according to the first embodiment, the number of molecules that pass the virtual plane A is counted, and the value obtained by "the fluxes being incident from below"/"the fluxes being incident from above" is considered to be a virtual deactivation probability for the virtual plane A. Further, the reaction probability calculated by "1−{(the fluxes being incident from below)/(the fluxes being incident from above)}" is used as the comprehensive reaction probability $H_2$ and is distinguished from the reaction probability defined by the expression "$\eta_Q$=the number of reacting molecules/the number of colliding molecules", which indicates the reaction probability at the surface point Q. In this example, the fluxes $F_{pd}$ (mol/m²sec) denotes the fluxes that pass the virtual plane A from bellow.

$$H_2 = 1 - \frac{\oint \int_A F_{Pd} dS_A}{\oint \int_A F_{Pu} dS_A} \quad (2)$$

In the explanation below, for the convenience of explanation, the comprehensive reaction probability (i.e. the comprehensive reaction probability $H_1$ or $H_2$) calculated using Equation (1) or Equation (2) will be referred to as a comprehensive reaction probability $\eta_{total}$.

Next, a reactive fluid simulation in the apparatus (i.e. the apparatus simulation at step S20) based on the comprehensive reaction probability will be explained.

For example, when 100,000 molecules having a reaction probability of $\eta_Q=10^{-5}$ become incident to a smooth and flat surface, the number of molecules that pass from below is 99,999. Thus, the comprehensive reaction probability is expressed as $\eta_{total}=10^{-5}$. Accordingly, the comprehensive reaction probability $\eta_{total}$ in this example is equal to the normal reaction probability (i.e. the reaction probability $\eta_Q$).

On the other hand, when a structure including non-smooth portions on a substrate, like the substrate 30, is considered, it is not possible to ignore the influence of multiple collisions, which means that the molecules having passed the virtual plane A collide against the surface of the substrate once and get reflected and then collide against another surface (i.e. other positions) before passing the virtual plane A again. As a result, for example, the number of molecules that pass from below is 99,990, whereas the number of molecules passing from above is 100,000. Thus, even if the molecules have the same reaction probability of $\eta_Q=10^{-5}$, the comprehensive reaction probability is expressed as $\eta_{total}=10^{-4}$. Accordingly, the comprehensive reaction probability $\eta_{total}$ in this example may be largely different from the reaction probability $\eta_Q$ calculated for the smooth and flat surface.

For this reason, if an apparatus simulation is performed on a structure that includes non-smooth portions on a substrate, using only the reaction probability $\eta_Q$, it is not possible to perform the apparatus simulation accurately. On the other hand, for example, when the consumption (phenomenon) of the CVD raw material gas is simulated by performing the apparatus simulation described at step S20, it is not necessary to consider the actual microstructure. It is possible to accurately calculate the concentration distribution within the reaction apparatus by using the comprehensive reaction probability $\eta_{total}$ defined above.

Let us assume that the comprehensive reaction probability $\eta_{total}$ does not depend on the vapor phase concentration of the molecules being the target. Based on this assumption, it is possible to obtain, in a one-to-one correspondence, the comprehensive reaction probability $\eta_{total}$, based on the original reaction probability $\eta_Q$ and the structure on the surface (i.e. the microstructure B). Thus, even when the comprehensive reaction probability $\eta_{total}$ is introduced as a boundary condition on the substrate surface for performing the apparatus simulation, it is possible to calculate the vapor phase concentration in the apparatus easily, without having to perform any convergence calculation.

A specific example of a reactive fluid simulation in an apparatus will be explained. First, as an example of an apparatus simulation, an apparatus simulation performed on a film deposition apparatus (i.e. a reaction chamber) will be explained.

Figure 6:
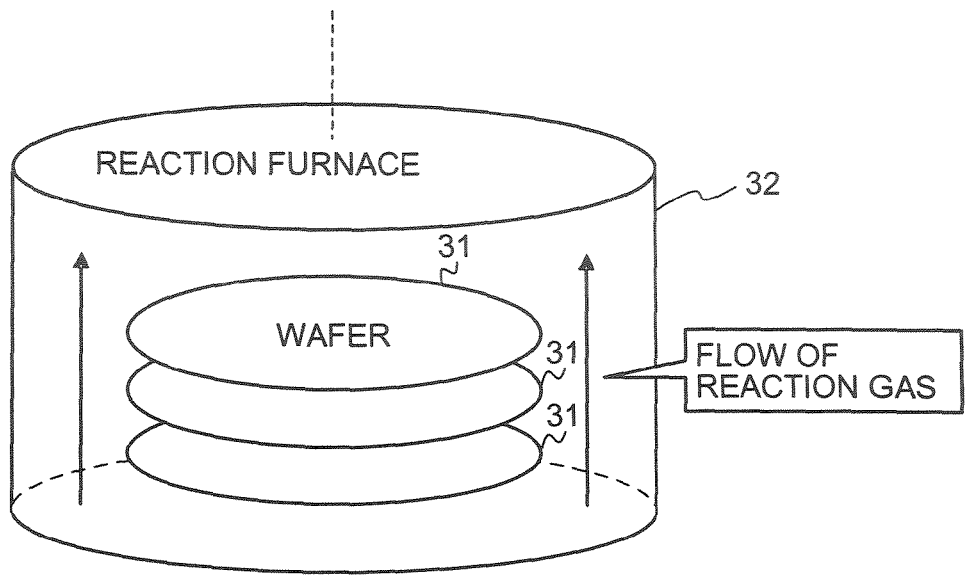
FIG. 6 is a drawing for explaining an example of a model of a reaction chamber in a film deposition apparatus.

As shown in FIG. 6, the film deposition apparatus in this example is assumed to be a reaction chamber (a vertical Low Pressure CVD (LPCVD) chamber) 32 in which a plurality of wafers 31 (i.e. semiconductor wafers like silicon substrates) are arranged in a row with predetermined intervals and in a direction perpendicular to an in-plane direction of the wafers 31 (i.e. in the direction in which deposited film layers are stacked). In the reaction chamber 32, a gas that is used as the raw material in the film deposition is flowing in the surroundings of the wafers 31.

Figure 7:
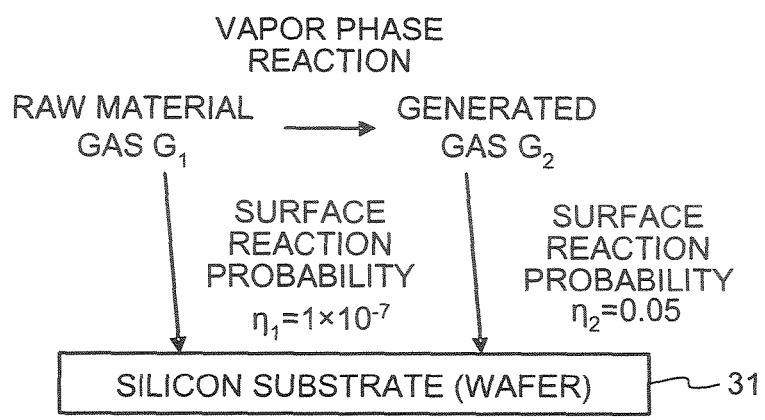
FIG. 7 is a drawing for explaining an example of a model of a chemical reaction in a film deposition apparatus.

As shown in FIG. 7, the model of the chemical reaction (i.e. the vapor phase reaction) in the reaction chamber 32 is based on an assumption that both the generated gas $G_2$ that is generated as a result of decomposition of the raw material gas $G_1$ in the vapor phase and the raw material gas $G_1$ contribute to the film deposition on the wafers 31. In this model, an example is shown in which the reaction probability of the raw material gas $G_1$ on the surface of the wafers 31, i.e. the surface reaction probability $\eta_1$, is expressed as $\eta_1=1\times10^{-7}$, whereas the reaction probability of the generated gas $G_2$ on the surface of the wafers 31, i.e. the surface reaction probability $\eta_2$, is expressed as $\eta_2=0.05$.

The relationship between the surface structure of the wafers 31 and the film deposition speed in the film deposition apparatus will be explained. The wafer 31 shown in FIG. 8 has a flat structure on the entire surface thereof. On the other hand, 50% of the area of the wafer 31 shown in FIG. 9 has a trench structure with an aspect ratio of 40, while the rest of the area has a flat structure.

With the wafer 31 shown in FIG. 8, the comprehensive reaction probability of the raw material gas $G_1$ is, for example, $\eta_{total\_1}=\eta_1$, whereas the comprehensive reaction probability of the generated gas $G_2$ is, for example, $\eta_{total\_2}=\eta_2$. With the wafer 31 shown in FIG. 9, the comprehensive reaction probability of the raw material gas $G_1$ is, for example, $\eta_{total\_1}=\eta_1\times41$, whereas the comprehensive reaction probability of the generated gas $G_2$ is, for example, $\eta_{total\_2}=\eta_2\times3.3$.

Figure 9:
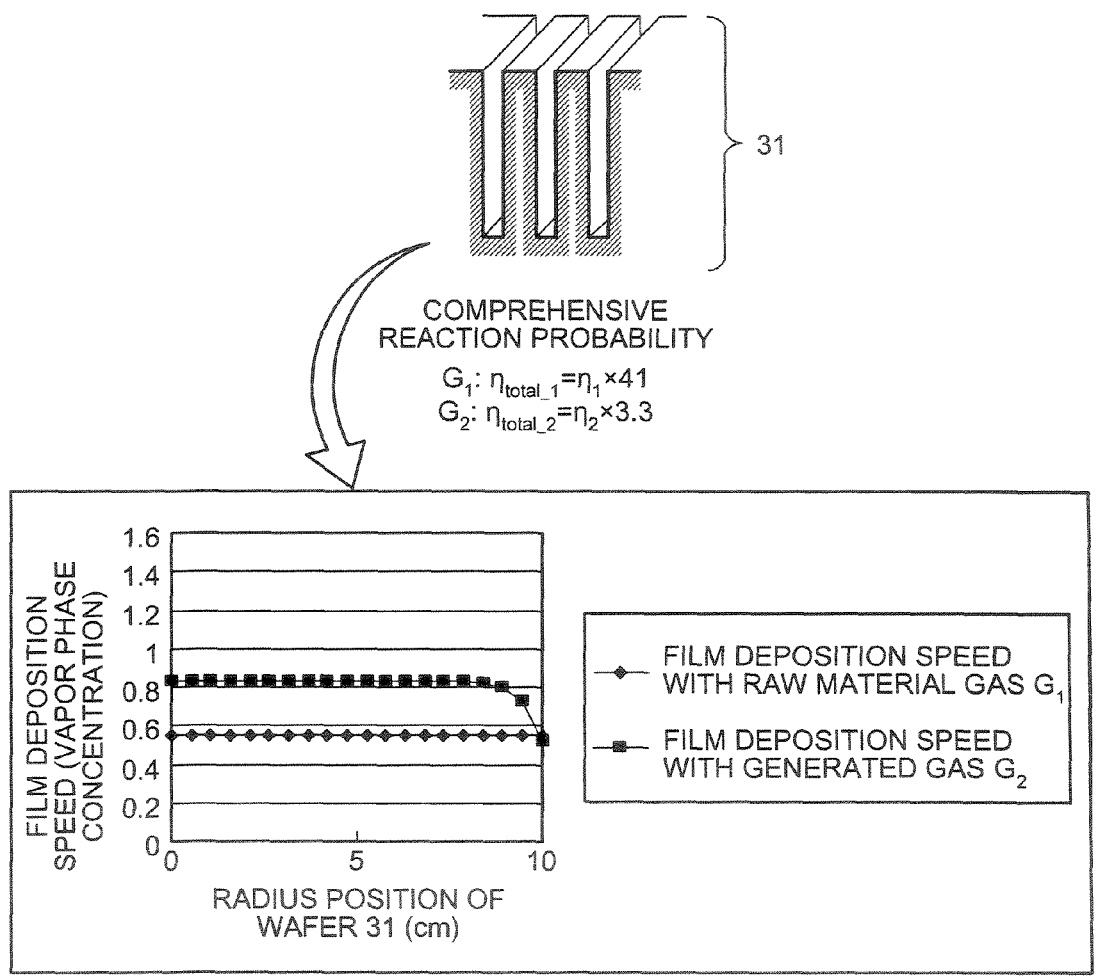
FIG. 9 is a drawing for explaining a film deposition speed with a wafer having a trench structure.

In FIG. 8 and FIG. 9, the results of the calculations of the comprehensive reaction probabilities and the distributions of the film deposition speeds in the radial direction of the wafers 31 (i.e. the silicon substrates or the like) that are calculated using the comprehensive reaction probabilities as boundary conditions are shown. Each of the distributions of the film deposition speeds in these examples is obtained by multiplying the fluxes with respect to the open plane by the reaction probability on the surface of the wafers 31 (which is the original reaction probability obtained while the surface structure of the wafers (the substrates) is ignored and is different from the comprehensive reaction probability). Each of the deposition speed distributions is similar to a distribution of the surface gas concentration.

As shown in FIG. 8 and FIG. 9, the distributions of the film deposition speeds with the generated gas $G_2$ largely vary for each of the mutually different surface structures of the wafers 31. More specifically, the simulation results are very different from each other between the simulation of the film deposition speed that is performed while the surface structure of the wafers 31 is taken into consideration and the simulation of the film deposition speed that is performed while the surface structure of the wafers 31 is not taken into consideration. In other words, when the surface structure of the wafers 31 is a trench structure, if a simulation of the film deposition speed is performed on an assumption that the wafers 31 each have a flat structure, the result of the simulation (i.e. the distribution of the film deposition speed) will be inaccurate.

Figure 10:
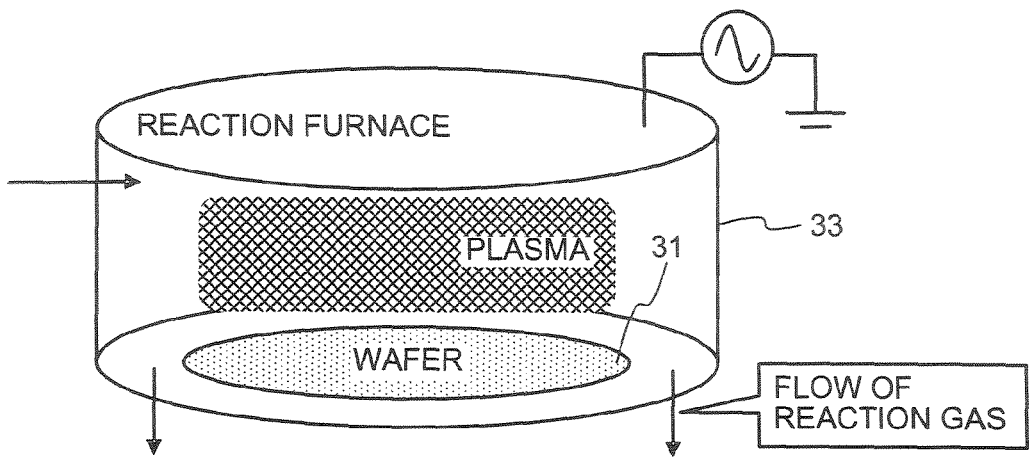
FIG. 10 is a drawing for explaining an example of a model of a reaction chamber in a plasma etching apparatus.

As an example of an apparatus simulation, an apparatus simulation performed on a plasma etching apparatus (i.e. a reaction chamber) will be explained. As shown in FIG. 10, the plasma etching apparatus in this example is assumed to be a single-wafer type reaction chamber 33 that performs a processing on a single wafer 31 in one etching process. In the apparatus simulation in this example, because plasmas are used in the etching process, the apparatus simulation is performed while the ion reactions are taken into consideration. Also, the apparatus simulation is performed while the difference caused by the materials of the surface of the wafer 31 is taken into consideration, instead of the difference caused by the three-dimensional structures on the surface of the wafer 31.

Figure 11:
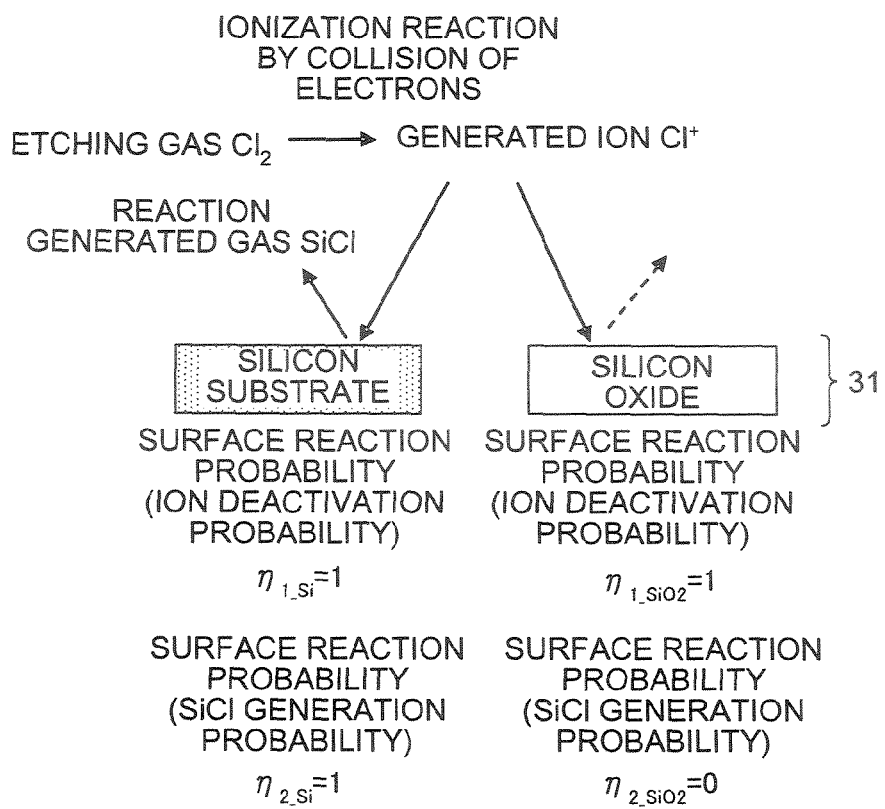
FIG. 11 is a drawing for explaining an example of a model of a chemical reaction in a plasma etching apparatus.

As shown in FIG. 11, in the model of the chemical reaction (i.e. the ionization reaction) in the reaction chamber 33, the generated ions $Cl_2^+$ generated in the ionization reaction caused by electron collisions of the etching gas $Cl_2$ contribute to the etching of the wafer 31. When the surface of the wafer 31 is a silicon substrate, a reaction generated gas SiCl is comes out of the silicon substrate.

In this model, an example is shown in which, when the surface of the wafer 31 is silicon (i.e. a silicon substrate), the surface reaction probability (i.e. the ion deactivation probability) for the wafer 31 is expressed as $\eta_{1\_Si}=1$, whereas the surface reaction probability (i.e. the SiCl generation probability) is expressed as $\eta_{2\_Si}=1$.

Also, another example is shown in which, when the surface of the wafer 31 is a silicon oxide, the surface reaction probability (i.e. the ion deactivation probability) for the wafer 31 is expressed as $\eta_{1\_SiO2}=1$, whereas the surface reaction probability (i.e. the SiCl generation probability) is expressed as $\eta_{2\_SiO2}=0$.

Next, the relationship between the surface structure of the wafer 31 and the vapor phase concentration in a plasma etching apparatus will be explained. The wafer 31 (i.e. the silicon plane) shown in FIG. 12 has a uniform structure (i.e. a surface structure without a $SiO_2$ mask) on the entire surface thereof. On the other hand, 30% of the entire surface of the wafer 31 shown in FIG. 13 has a structure covered by a $SiO_2$ mask, while the rest of the area has a flat structure.

Figure 12:
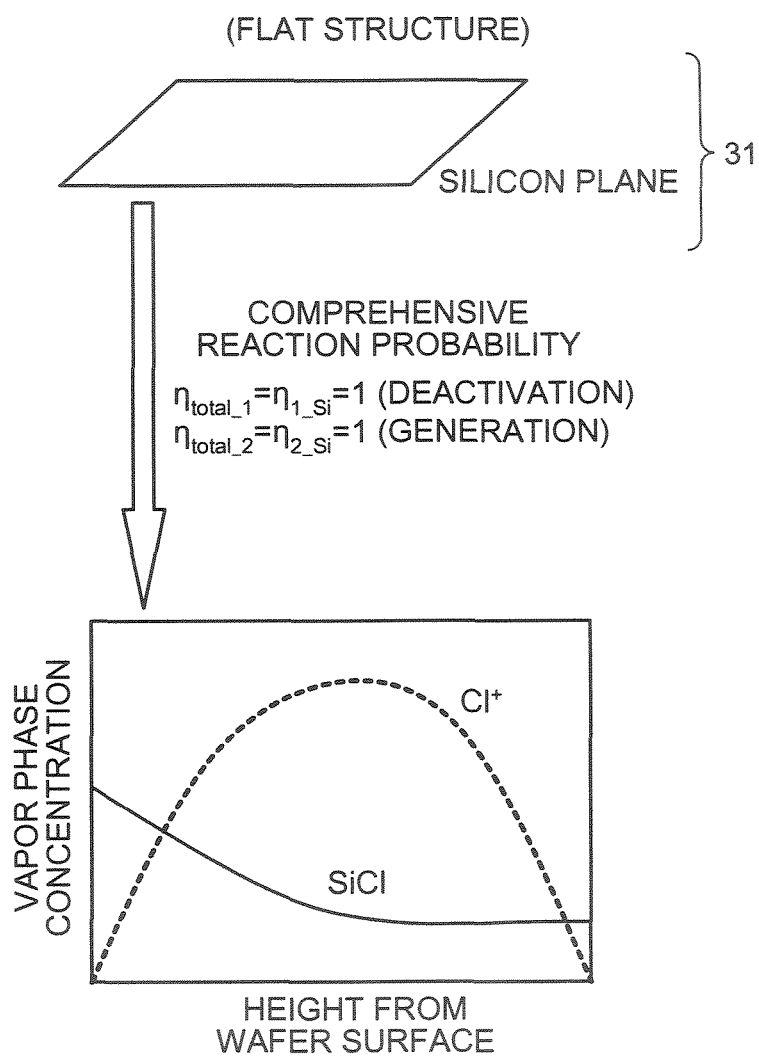
FIG. 12 is a drawing for explaining a vapor phase concentration in a plasma etching apparatus with a wafer having a uniform structure.

With the wafer 31 shown in FIG. 12, the comprehensive reaction probability (the deactivation) of Si is, for example, $\eta_{total\_1}=\eta_{1\_Si}=1$, whereas the comprehensive reaction probability (the generation) of the reaction generated gas SiCl is, for example, $\eta_{total\_2}=\eta_{2\_Si}=1$.

With the wafer 31 shown in FIG. 13, the comprehensive reaction probability (the deactivation) of $SiO_2$ is, for example, $\eta_{total\_1}=\eta_{1\_Si}\times 0.7+\eta_{1\_SiO2}\times 0.3=1$, whereas the comprehensive reaction probability (the generation) of the reaction generated gas SiCl is, for example, $\eta_{total\_2}=\eta_{2\_Si}\times 0.7+\eta_{2\_SiO2}\times 0.3=0.7$.

In FIG. 12 and FIG. 13, the results of the calculations of the comprehensive reaction probabilities and the distributions of the vapor phase in the reaction chamber 33 calculated using the obtained comprehensive reaction probabilities as boundary conditions (i.e. the relationship between the height direction of the wafer 31 and the vapor phase concentration) are shown.

As shown in FIG. 12 and FIG. 13, the distributions of the vapor phase concentration of SiCl largely vary for each of the mutually different surface structures of the wafer 31. More specifically, the simulation results are very different from each other between the simulation of an etching process that is performed while the surface structure of the wafer 31 is taken into consideration and the simulation of an etching process that is performed while the surface structure of the wafer 31 is not taken into consideration. In other words, when a part of the surface of the wafer 31 is covered by $SiO_2$, if a simulation of an etching process is performed on an assumption that the wafer 31 each have a uniform structure, the result of the simulation (i.e. the distribution of the vapor phase concentration) will be inaccurate.

As explained above, it is possible to apply the comprehensive reaction probability according to the first embodiment even to a situation where a new gas (SiCl) comes out of the wafer 31 due to the reaction on the surface of the wafer 31 during an etching process of the wafer 31.

The processing (at step S30) in a simulation performed on a processed-profile of the microstructure B, using the vapor phase concentration calculated in a reactive fluid simulation in the apparatus will be explained in details with reference to FIG. 14. The profile simulation performed on the processed-profile in this example is mainly characterized in that it is not necessary to perform a convergence calculation, which is performed in a profile simulation on a processed-profile according to the conventional technique.

By performing a reactive fluid simulation in the apparatus while the influence of the surface structure of the wafer 31 exerted on the chemical reaction is taken into consideration, it is possible to calculate a vapor phase concentration that corresponds to the surface structure of the wafer 31. Subsequently, the control unit 10 calculates flux data of the molecules to the virtual plane A. In this situation, the control unit 10 calculates the flux data by converting the calculated vapor phase concentration (i.e. the vapor phase concentration $C_A$) on the virtual plane A into fluxes F of the chemical species (step S210).

The method of converting the vapor phase concentration on the virtual plane A into the fluxes F will be explained. For example, an expression by Motz and Wise is used on an assumption that neutral molecules are involved. More specifically, by using Equation (3) where M denotes the mass of the molecules, $k_B$ denotes a Boltzmann constant, T denotes one of the gas temperature and the surface temperature, $\eta_{total}$ denotes the comprehensive reaction probability, and $C_A$ denotes the vapor phase concentration on the virtual plane A, it is possible to convert the vapor phase concentration on the virtual plane A into the fluxes F.

$$F = \frac{\eta_{total}}{2 \cdot (2 - \eta_{total})} \sqrt{\frac{8k_B T}{\pi M}} \cdot C_A \qquad (3)$$

Also, on an assumption that ions are involved, it is possible to convert the vapor phase concentration on the virtual plane A into the fluxes F, by using, for example, the Bohm speed. More specifically, by using Equation (4) where $T_e$ denotes the electron temperature, and $C_A$ denotes the concentration at a sheath edge of the plasma, it is possible to convert the vapor phase concentration on the virtual plane A into the fluxes F.

$$F = \sqrt{\frac{k_B T_e}{M}} \cdot C_A \qquad (4)$$

In the explanation above, the examples in which the vapor phase concentration on the virtual plane A is converted into the fluxes F, using the expression by Motz and Wise and the Bohm speed are explained. However, the method for converting the vapor phase concentration on the virtual plane A into the fluxes F is not limited to these examples. It is acceptable to perform the conversion using any other method.

The control unit 10 specifies the virtual plane A as the boundary of the calculation area. Subsequently, the control unit 10 performs a profile simulation on the processed-profile of the microstructure B, using the calculated flux data as the boundary condition (step S220).

As a result, it is possible to perform the profile simulation on the processed-profile of the microstructure B, while appropriately taking into consideration the influence of the difference in the surface structures of the wafer 31 exerted on the processed-profile of the microstructure B.

The processed-profile of the microstructure B (i.e. the simulation result) on which the calculation (i.e. the simulation) is performed based on the reactive fluid simulation (i.e. the film deposition speed) in the apparatus that has been explained at step S20 will be explained.

The processed-profile shown on the left side in FIG. 15 denotes a result of a simulation performed on a processed-profile that corresponds to the simulation example of the film deposition speed in the film deposition apparatus with a wafer having a flat structure, which is explained with reference to FIG. 8. The processed-profile shown on the right side in FIG. 15 denotes a result of a simulation performed on a processed-profile that corresponds to the simulation example of the film deposition speed in the film deposition apparatus with a wafer having a trench structure, which is explained with reference to FIG. 8. More specifically, the processed-profile shown on the left side in FIG. 15 (i.e. the result of the simulation performed on the film deposition) is a processed-profile (i.e. a cross sectional view) on which a profile simulation is performed, using the vapor phase concentration calculated on an assumption that the wafer 31 (i.e. the substrate 30) is smooth. On the other hand, the processed-profile shown on the right side in FIG. 15 (i.e. the result of the simulation performed on the film deposition) is a processed-profile (i.e. a cross sectional view) on which a profile simulation is performed, using the vapor phase concentration calculated on an assumption that 50% of the area of the wafer 31 (i.e. the substrate 30) has a trench structure with the aspect ratio of 40.

As shown in FIG. 15, the processed-profiles (i.e. the simulation results) are different from each other between when the profile simulation is performed on the processed-profile using the vapor phase concentration calculated on the assumption that the wafer 31 is smooth and when the profile simulation is performed on the processed-profile using the vapor phase concentration calculated on the assumption that 50% of the area of the wafer 31 has the trench structure with the aspect ratio of 40.

In other words, the thickness of the film (i.e. a film thickness 35A) deposited on the upper surface of the wafer 31 on the assumption that the wafer 31 is smooth is larger than the thickness of the film (i.e. a film thickness 35B) deposited on the upper surface of the wafer 31 on the assumption that the wafer 31 has a trench structure.

On the other hand, the thickness of the film (i.e. a film thickness 36A) deposited on the surface of the trench inner wall of the wafer 31 on the assumption that the wafer 31 is smooth is smaller than the thickness of the film (i.e. a film thickness 36B) deposited on the surface of the trench inner wall of the wafer 31 on the assumption that the wafer 31 has a trench structure.

The processed-profile of the microstructure B (i.e. the simulation result) on which a calculation (i.e. a simulation) is performed, based on the reactive fluid simulation (the vapor phase concentration) in the apparatus explained at step S20 will be explained.

The processed-profile shown on the left side in FIG. 16 denotes a processed-profile (i.e. a simulation result) that corresponds to the simulation example of the vapor phase concentration in the plasma etching apparatus with a wafer having a uniform structure, which is explained with reference to FIG. 12. On the other hand, the processed-profile shown on the right side in FIG. 16 denotes a processed-profile (i.e. a simulation result) that corresponds to the simulation example of the film deposition speed in the film deposition apparatus with a wafer having a mask structure, which is explained with reference to FIG. 13. More specifically, the processed-profile shown on the left side in FIG. 16 (i.e. the result of the etching simulation) is a processed-profile (i.e. a cross sectional view) on which a profile simulation is performed, using the vapor phase concentration calculated on an assumption that the wafer 31 (i.e. the substrate 30) is uniform. On the other hand, the processed-profile shown on the right side in FIG. 16 (i.e. the result of the etching simulation) is a processed-profile (i.e. a cross sectional view) on which a profile simulation is performed, using the vapor phase concentration calculated on an assumption that 30% of the entire surface of the wafer 31 has a structure covered by a $SiO_2$ mask.

As shown in FIG. 16, the processed-profiles (i.e. the results of the etching simulations) are different from each other between when the profile simulation is performed on the processed-profile using the vapor phase concentration calculated on the assumption that the wafer 31 is uniform and also a deposited substance 1 being deposited on the surface (i.e. a side-wall surface) of the etching target substance (i.e. the Si substrate) and when the profile simulation is performed on the processed-profile using the vapor phase concentration calculated on the assumption that 30% of the entire surface of the wafer 31 has the structure covered by the $SiO_2$ mask.

More specifically, when the wafer 31 is uniform (SiCl), the thickness is larger than the thickness of a deposited substance being deposited on the surface of the etching target substance on an assumption that the wafer 31 has a structure that is covered by a $SiO_2$ mask. In other words, the processed-profile on an assumption that the wafer 31 is smooth has a size larger than the processed-profile on an assumption that the wafer 31 has a structure covered by a SiO$_2$ mask (i.e. the gradient of the side-wall surface of the Si substrate on which the etching has been performed is more gradual.).

The simulation apparatus 1 according to the first embodiment is configured to include the input unit 11, the output unit 12, and the control unit 10 (the CPU 15, the ROM 16, and the RAM 17). However, it is also acceptable to configure the simulation apparatus 1 to further include an external storage device such as a Hard Disk Drive (HDD), a Compact Disc (CD) drive device, or the like.

In such a situation, the various types of programs (i.e. the programs related to the various types of simulations) that are executed by the simulation apparatus 1 according to the first embodiment may be provided as being recorded on a computer-readable recording medium such as a Compact Disc Read Only Memory (CD-ROM), a Flexible Disk (FD), a Compact Disk Recordable (CD-R), or a Digital Versatile Disk (DVD), in a file that is in an installable format or in an executable format.

Alternatively, it is acceptable to store the programs executed by the simulation apparatus 1 according to the first embodiment into a computer connected to a network such as the Internet and to provide the programs by allowing the programs to be downloaded via the network. Further alternatively, it is acceptable to provide or distribute the programs executed by the simulation apparatus 1 according to the first embodiment via a network such as the Internet. In addition, it is acceptable to provide the programs according to the first embodiment by having them incorporated into a ROM or the like in advance.

According to the first embodiment, the apparatus simulations performed on the CVD process and the RIE process have been explained. However, the apparatuses on which the apparatus simulations are performed are not limited to these apparatuses. It is acceptable to apply the apparatus simulations to other apparatuses. For example, it is acceptable to perform an apparatus simulation on a sputtering apparatus or the like.

As explained above, according to the first embodiment, by specifying the reaction probability between the surface substance of the wafer 31 and the chemical species and the surface structure of the wafer 31, it is possible to define the comprehensive reaction probability, independently of the vapor phase concentration in the reaction chamber 32 (or the reaction chamber 33). Thus, it is possible to determine the comprehensive reaction probability before calculating the vapor phase concentration by an apparatus simulation inside the semiconductor process apparatus. Accordingly, it is not necessary to perform the repetitive convergence calculations, which are performed according to the conventional technique disclosed in Carlo Cavallotti et al., J. Crystal Growth 248 (2003) 411. Consequently, it is possible to perform, with a simple calculation, an apparatus simulation that is rapid and highly efficient, while the influence of the microstructure on the surface of the wafer 31 is taken into consideration.

In addition, the fluxes of the molecules with respect to an open plane are calculated, based on the vapor phase concentration distribution in the reaction chamber 32 or 33 that has been obtained in the apparatus simulation. Thus, it is possible to perform, with a simple calculation, the profile simulation efficiently on the processed-profile of the microstructure device, using the calculated flux values. Accordingly, it is possible to perform the profile simulation that is rapid and highly efficient, while the influence of the microstructure on the surface of the wafer 31 is taken into consideration.

A second embodiment of the present invention will be explained with reference to FIG. 17. The elements that are the same as those in the first embodiment will be referred to by using the same reference numerals, and the explanation thereof will be omitted. According to the second embodiment, an area for which a comprehensive reaction probability is calculated has a size equal to or larger than the mesh size that is used when an apparatus simulation is performed.

In the numerical calculations related to comprehensive reaction probabilities and the numerical calculations related to apparatus simulations, it is possible to deal with only discretized data. Thus, when these numerical calculations are performed, as shown in FIG. 17, the area for which a comprehensive reaction probability is calculated and the area (i.e. the calculation area) on which an apparatus simulation is performed are each divided with a mesh having a predetermined size so that the numerical calculations can be performed.

In these situations, when the number of sections in a mesh is larger, it takes long time to perform the numerical calculations. When the number of sections in a mesh is small, the level of precision in the numerical calculations becomes lower. When an apparatus simulation is performed, it is necessary to divide the mesh into sections to such an extent that it is possible to calculate the concentration distribution inside the apparatus accurately. For example, by dividing a mesh into sections having a size that is approximately 10 to 100 times larger than the mean free path of the gas molecules, it is possible to calculate the concentration distribution in the apparatus accurately.

Also, when a calculation is performed with regard to the inside of a microstructure (i.e. when a numerical calculation related to a comprehensive reaction probability is performed), it is necessary to divide a mesh into sections to such an extent that it is possible to perform the calculation related to the inside of the microstructure accurately. The mesh size used for performing the calculation of the inside of the microstructure is smaller than the mesh size used for performing an apparatus simulation, because the device size on which the calculation of the inside of the microstructure is performed is smaller than the size of the apparatus.

According to the second embodiment, the entire calculation area of the microstructure is averaged using the simulation of the microstructure (i.e. the simulation related to the structure), so that a comprehensive reaction probability is calculated. Also, the calculated comprehensive reaction probability is used as a boundary condition for the apparatus simulation. In this situation, defining the comprehensive reaction probability with a position resolution level that is smaller than the mesh size used in the apparatus simulation makes the apparatus simulation meaningless because it is not possible to improve the precision level of the apparatus simulation. Also, in this situation, the apparatus simulation becomes more complicated because it is necessary to calculate comprehensive reaction probabilities at many points in one mesh being used in the apparatus simulation and to perform an averaging process or an interpolation process with a function.

To cope with this situation, according to the second embodiment, it is arranged so that the area for which a comprehensive reaction probability is calculated has a size equal to or larger than the mesh size that is used when an apparatus simulation is performed. In other words, the calculation of the comprehensive reaction probability is performed with a spatial resolution level that is equal to or larger than the mesh size being used in the apparatus simulation. More specifically, when the control unit 10 calculates the comprehensive reaction probability, an area that has a size equal to or larger than the mesh size used when the apparatus simulation is performed is extracted as an area for which the comprehensive reaction probability is calculated. Also, when the apparatus simulation is performed, the apparatus simulation is performed with a mesh size that is equal to or smaller than the area for which the comprehensive reaction probability is calculated. With these arrangements, it is possible to improve the level of precision in the apparatus simulation.

As explained above, according to the second embodiment, the area for which the comprehensive reaction probability is calculated is arranged to have a size equal to or larger than the mesh size that is used when the apparatus simulation is performed. Thus, it is possible to incorporate the comprehensive reaction probability easily, as a boundary condition in the apparatus simulation. Thus, it is not necessary to calculate a plurality of comprehensive reaction probabilities within one mesh used in the apparatus simulation. In addition, it is possible to perform the apparatus simulation easily with a high level of precision.

Figure 19:
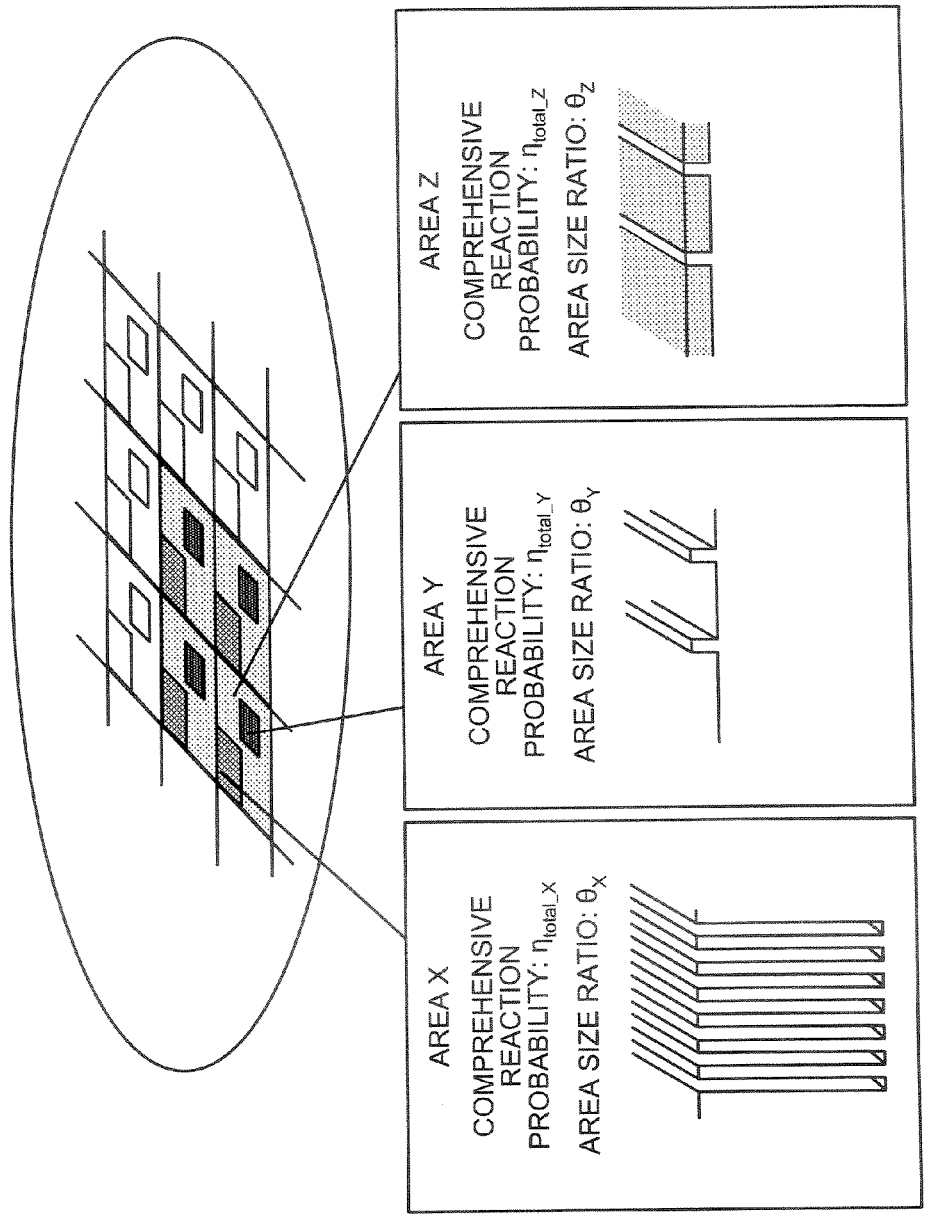
FIG. 19 is a drawing for explaining a method for calculating a comprehensive reaction probability.
Figure 20:
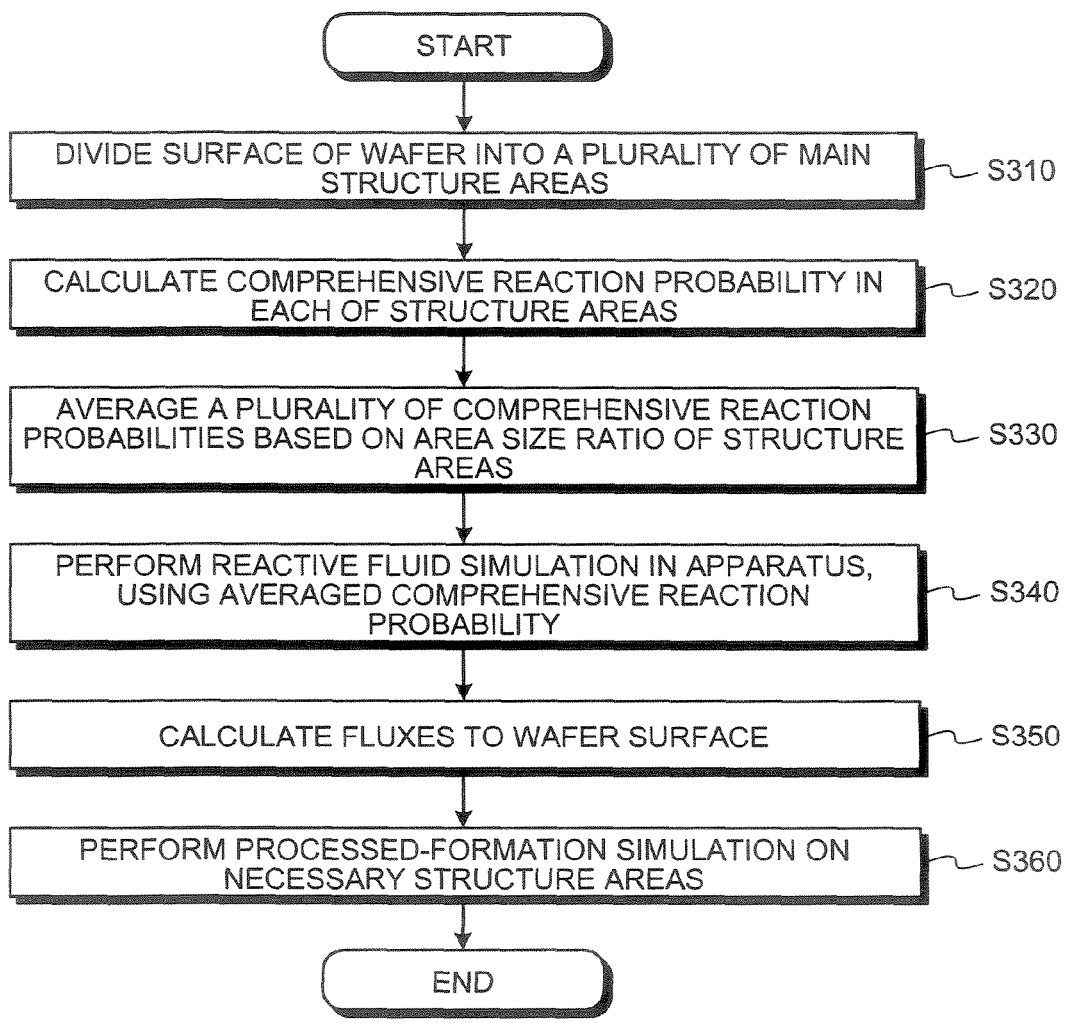
FIG. 20 is a flowchart of a procedure for calculating a comprehensive reaction probability.

A third embodiment of the present invention will be explained with reference to FIG. 18 through FIG. 20. The elements that are the same as those in the first embodiment or the second embodiment will be referred to by using the same reference numerals, and the explanation thereof will be omitted. According to the third embodiment, a comprehensive reaction probability is calculated for each of a plurality of areas (i.e. device patterns) having mutually different surface structures, and a comprehensive reaction probability for the entire wafer is calculated based on the area size ratio of those areas.

In general, a plurality of device patterns (i.e. device structures) are formed on a wafer (i.e. a semiconductor substrate). The device patterns are different from one another in each of the areas of the wafer. In other words, the device patterns of the wafer are not uniform and are formed with various structures, depending on where they are positioned on the wafer.

Accordingly, to calculate a comprehensive reaction probability, it is insufficient to perform the calculation by using only a specific surface structure (i.e. a device pattern) as the target. It is necessary to calculate a comprehensive reaction probability that corresponds to each of the plurality of surface structures. On the other hand, in an apparatus simulation that takes a long time, especially, for example, in a plasma process, there are many situations where a calculation that is simplified with a spatially zero dimensional (on an assumption that a perfect stired reactor is used) or one dimensional is performed to shorten the calculation period.

For example, to an apparatus simulation, a perfect stired reactor model may be applied with which the vapor phase concentration or the like is calculated on an assumption that the gas (i.e. a lean gas) in the apparatus (i.e. the reaction chamber 32 or 33) is completely mixed and is in a uniform state. Even in this situation, because the influence of the wafer surface is exerted on the vapor phase within the apparatus, it is necessary to perform the apparatus simulation while bringing the influence of the wafer surface into the vapor phase in the apparatus, as feedback.

On the other hand, according to the method disclosed in Carlo Cavallotti et al., J. Crystal Growth 248 (2003) 411., the simulation performed on the reaction chamber requires the concentration near the wafer surface and the gradient of the concentration. Thus, it is not possible to apply the method disclosed in the Carlo Cavallotti et al. document when the approximation with the perfect stired reactor is used.

To cope with this situation, according to the third embodiment, a comprehensive reaction probability is calculated for each of a plurality of areas that have mutually different surface structures, so that a value obtained by averaging the comprehensive reaction probabilities for the areas based on the area size ratio of the areas will be used as a comprehensive reaction probability of the entire wafer.

Figure 18:
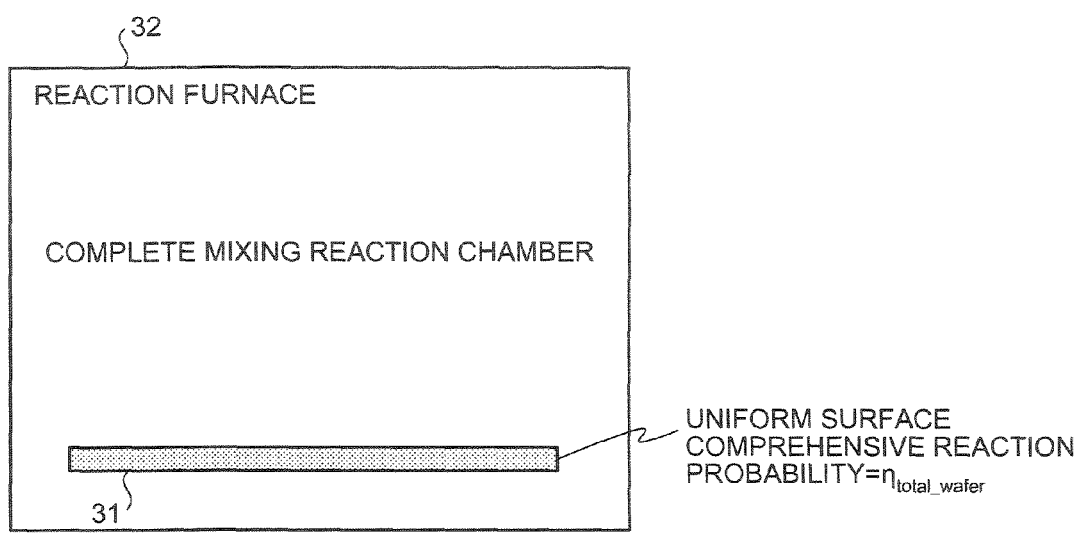
FIG. 18 is a drawing for explaining an approximation of a comprehensive reaction probability, using a perfect stired reactor.

As shown in FIG. 18, in this example, it is assumed that the reaction chamber is a complete mixing chamber, and also that the surface of the wafer 31 is a uniform surface, to calculate the comprehensive reaction probability of the entire wafer 31.

To calculate a comprehensive reaction probability, the control unit 10 divides the surface of the wafer 31 into a plurality of structure areas (step S310). The control unit 10 divides, as shown in FIG. 19 for example, the surface area into an area X, an area Y, and an area Z over the chips of the wafer 31, based on the device patterns.

Then, the control unit 10 calculates comprehensive reaction probabilities (i.e. $\eta_{total\_X}$, $\eta_{total\_Y}$, and $\eta_{total\_Z}$) in the structure areas (i.e. the area X, the area Y, and the area Z) respectively (step S320). Also, the control unit 10 calculates area size ratios of the structure areas within the chips (i.e. an area size ratio $\theta_X$ of the area X; an area size ratio $\theta_Y$ of the area Y; and an area size ratio $\theta_Z$ of the area Z).

The control unit 10 averages the comprehensive reaction probabilities of the structure areas, based on the area size ratios of the structure areas (i.e. the surface is treated as a uniform surface) (step S330). More specifically, the comprehensive reaction probability (i.e. the average) for the entire wafer is calculated using an expression, $\eta_{total}=(\eta_{total\_X}\times\theta_X)+(\eta_{total\_Y}\times\theta_Y)+(\eta_{total\_Z}\times\theta_Z)$. Subsequently, an apparatus simulation and a processed-profile simulation are performed using the same procedure as the one explained in the description of the first embodiment.

In other words, a reactive fluid simulation in the apparatus is performed using the averaged comprehensive reaction probability. Further, the fluxes to the wafer surface are calculated, and a processed-profile simulation is performed on the necessary structure areas (steps S340 to S360).

In the description of the second embodiment, the reactive fluid simulation in the apparatus is performed using the averaged comprehensive probability for the entire surface of the wafer 31. However, the comprehensive reaction probability used when the reactive fluid simulation in the apparatus is performed is not limited to the value obtained by averaging the comprehensive reaction probabilities for the entire surface of the wafer 31. In other words, it is acceptable to perform the reactive fluid simulation in the apparatus by using a comprehensive reaction probability that is obtained by averaging the comprehensive reaction probabilities of predetermined areas of the wafer 31.

As explained above, according to the third embodiment, a comprehensive reaction probability is calculated for each of the plurality of areas that have mutually different surface structures, so that the comprehensive reaction probability (i.e. the average) for the entire wafer is calculated, based on the area size ratios of the areas. Thus, it is possible to assume that each of the reaction chambers 32 and 33 is a complete mixing reaction chamber and to apply the perfect stired reactor model to the apparatus simulation. Accordingly, it is possible to perform an apparatus simulation and a profile simulation easily even on a wafer that has a complicated surface structure.

Figure 21:
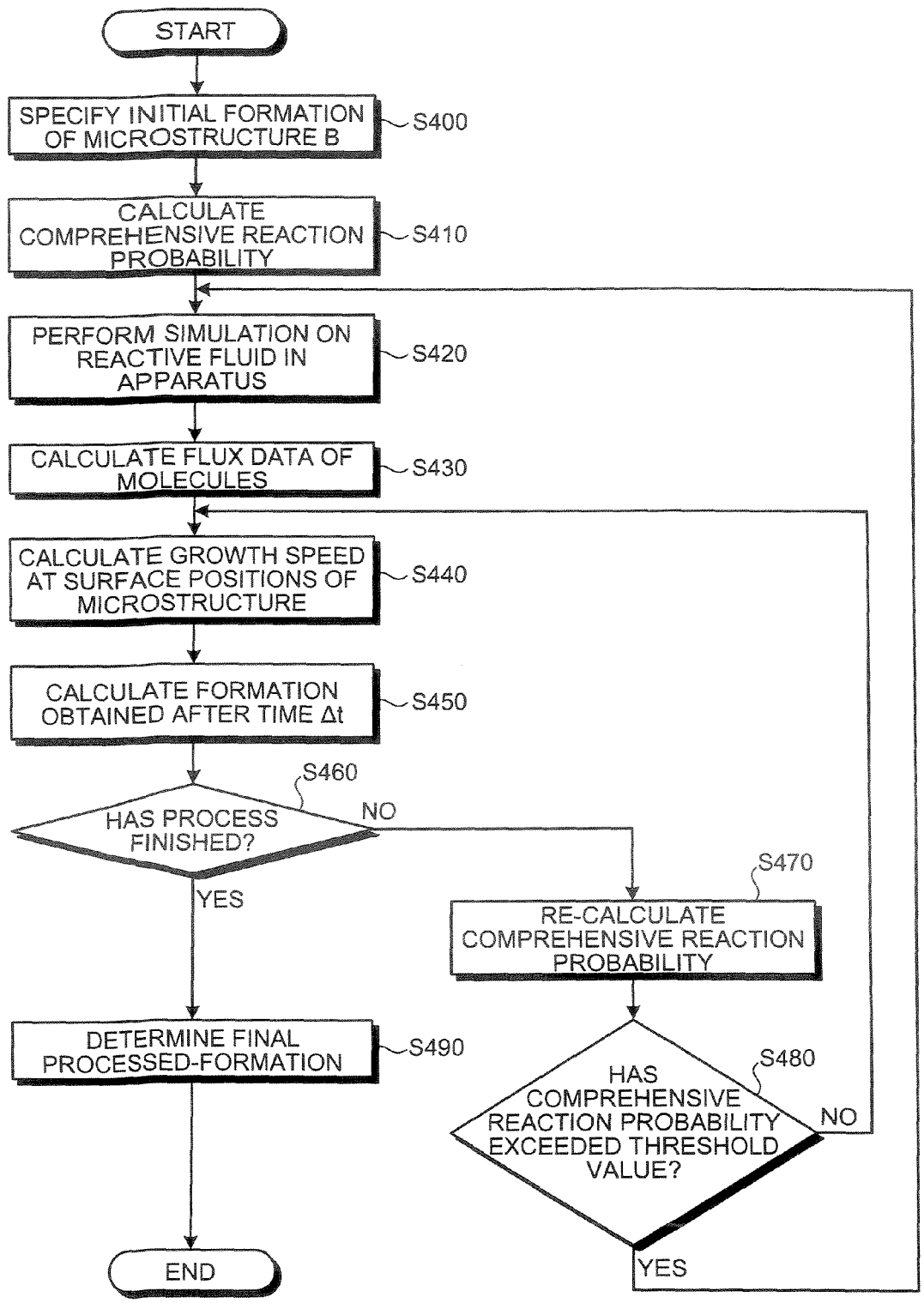
FIG. 21 is a flowchart of a processing procedure in an apparatus simulation that corresponds to changes in a surface profile.

A fourth embodiment of the present invention will be explained with reference to FIG. 21. The elements that are the same as those in any of the first through the third embodiments will be referred to by using the same reference numerals, and the explanation thereof will be omitted. According to the fourth embodiment, when the surface structure of a wafer changes due to progress in a reaction, comprehensive reaction probabilities that correspond to the changes in the surface structure are re-calculated. An apparatus simulation and a profile simulation are performed while the re-calculated comprehensive reaction probability is brought into a reactive fluid simulation in the apparatus, as feedback. The changes in the surface structure may be changes caused by a growth of a film or changes caused by an etching process. Also, the changes may be caused by a new film layer (e.g. a film layer that serves as an etch stop layer) that is exposed on the surface of a substrate because of an etching process.

For example, in a profile simulation performed on a semiconductor processing process such as a film deposition process or an etching process, the profile on the surface of a wafer changes as the process time elapses (i.e. the changes occur momentarily). If the profile on the surface of a wafer changes during a profile simulation, the comprehensive reaction probability on the wafer also changes according to the changes in the profile on the surface of the wafer.

To cope with this situation, according to the fourth embodiment, a value (e.g. an amount of change) with which the comprehensive reaction probability used in an apparatus simulation stops corresponding to the surface profile having changes is specified as a threshold value in advance. When the comprehensive reaction probability (e.g. the amount of change) exceeds the predetermined threshold value that has been specified in advance, the calculation is performed again in the apparatus simulation. A post-change comprehensive reaction probability that is obtained as a result of the re-calculation in the apparatus simulation is brought into the apparatus simulation as feedback, so that the apparatus simulation can be performed again.

The processing procedure that is used when an apparatus simulation and a profile simulation are performed while the comprehensive reaction probability is brought into a reactive fluid simulation in the apparatus as feedback will be explained with reference to FIG. 21.

A value with which the comprehensive reaction probability used in the apparatus simulation stops corresponding to the surface profile having changes is specified into the control unit 10 as a predetermined threshold value. Next, the control unit 10 specifies inprofile (i.e. an initial profile) related to the microstructure B on which a profile simulation is to be performed (step S400). The control unit 10 then calculates a comprehensive reaction probability that corresponds to the initial profile of the microstructure B (step 410). The calculation of the comprehensive reaction probability is performed through the same processing as the processing at step S10 (i.e. steps S110 to S150) explained in the description of the first embodiment.

The control unit 10 performs a simulation on the reactive fluid in the apparatus (step S420). The simulation on the reactive fluid in the apparatus is performed through the same processing as the processing at step S20 explained in the description of the first embodiment.

Further, the control unit 10 calculates flux data by converting the vapor phase concentration on the virtual plane A calculated in the simulation performed on the reactive fluid in the apparatus into the fluxes F of the molecules (step S430).

The control unit 10 performs a profile simulation, based on the reactive fluid simulation in the apparatus, and calculates a growth speed or the like at each of surface positions of the microstructure (step S440). Further, the control unit 10 calculates the profile on the surface of the wafer obtained after a time Δt, based on the growth speeds at the surface positions of the microstructure (step S450). Subsequently, the control unit 10 judges if the process on which the profile simulation is performed has finished (step S460).

If the process on which the profile simulation is performed has not finished (step S460: No), the control unit 10 re-calculates a comprehensive reaction probability that corresponds to the new profile on the surface of the wafer, based on the new profile of the surface of the wafer obtained in the processing performed at step S450 (step S470). The calculation of the comprehensive reaction probability is also performed through the same processing as the processing at step S10 explained in the description of the first embodiment.

Then, the control unit 10 judges if the re-calculated comprehensive reaction probability has exceeded the predetermined threshold value that has been specified in advance (step S480). If the re-calculated comprehensive reaction probability has exceeded the predetermined threshold value (step S480: Yes), the control unit 10 performs a simulation on the reactive fluid in the apparatus (step S420). Subsequently, the control unit 10 performs the processing at and after step S430.

On the other hand, if the re-calculated comprehensive reaction probability has not exceeded the predetermined threshold value (step S480: No), the control unit 10 performs a profile simulation and calculates a growth speed at each of the surface positions of the microstructure (step S440). Subsequently, the control unit 10 performs the processing at and after step S450.

The control unit 10 repeatedly performs the processing at and after step S470 until it is judged that the process on which the profile simulation is performed has finished in the processing performed at step S460. When the control unit 10 judges that the process on which the profile simulation is performed has finished (step S460: Yes), the profile of the surface of the wafer obtained after the time Δt that is calculated at step S450 at the last time is determined as the final processed-profile (step S490).

In some situations, a plurality of types of chemical species are dealt with in apparatus simulations and profile simulations. In such situations, it is necessary to calculate as many comprehensive reaction probabilities as the number of types of chemical species that are dealt with in each simulation. In that situation, it is not necessary to bring, as feedback, inprofile related to all the chemical species into the apparatus simulation. For example, when a processed-profile simulation is performed on a reactive ion etching process, re-adhesion of etching products has a strong influence on the profile. Thus, it is necessary and sufficient to keep track of the changes in the comprehensive reaction probability related to the releasing of the etching products caused by an etching reaction with ion collisions.

Thus, it is acceptable to specify a threshold value of the comprehensive reaction probability only for one or more chemical species that have a strong influence on the profile simulation. In such a situation, it is judged if the comprehensive reaction probability has exceeded the threshold value, only for the chemical species for which the threshold value has been specified. If the comprehensive reaction probability has exceeded the threshold value, the feedback is brought into the apparatus simulation.

The feedback may be brought into the apparatus simulation, using a comprehensive reaction probability that has been averaged for the entire wafer, as explained in the description of the third embodiment. In addition, as for the comprehensive reaction probability that is used when an apparatus simulation is performed once again, it is acceptable to select whether a value obtained in a very small area is used as it is or the comprehensive reaction probability averaged for the entire wafer is used, by referring to the actual process.

As described above, according to the fourth embodiment, when the surface structure of a wafer changes due to progress in the reaction, the comprehensive reaction probability that corresponds to the changes in the surface structure is re-calculated. The apparatus simulation and the profile simulation are performed while the re-calculated comprehensive reaction probability is brought into the reactive fluid simulation in the apparatus, as feedback. Thus, it is possible to perform the apparatus simulation and the profile simulation easily by using accurate comprehensive reaction probabilities that correspond to the changes in the surface structures.

Figure 22:
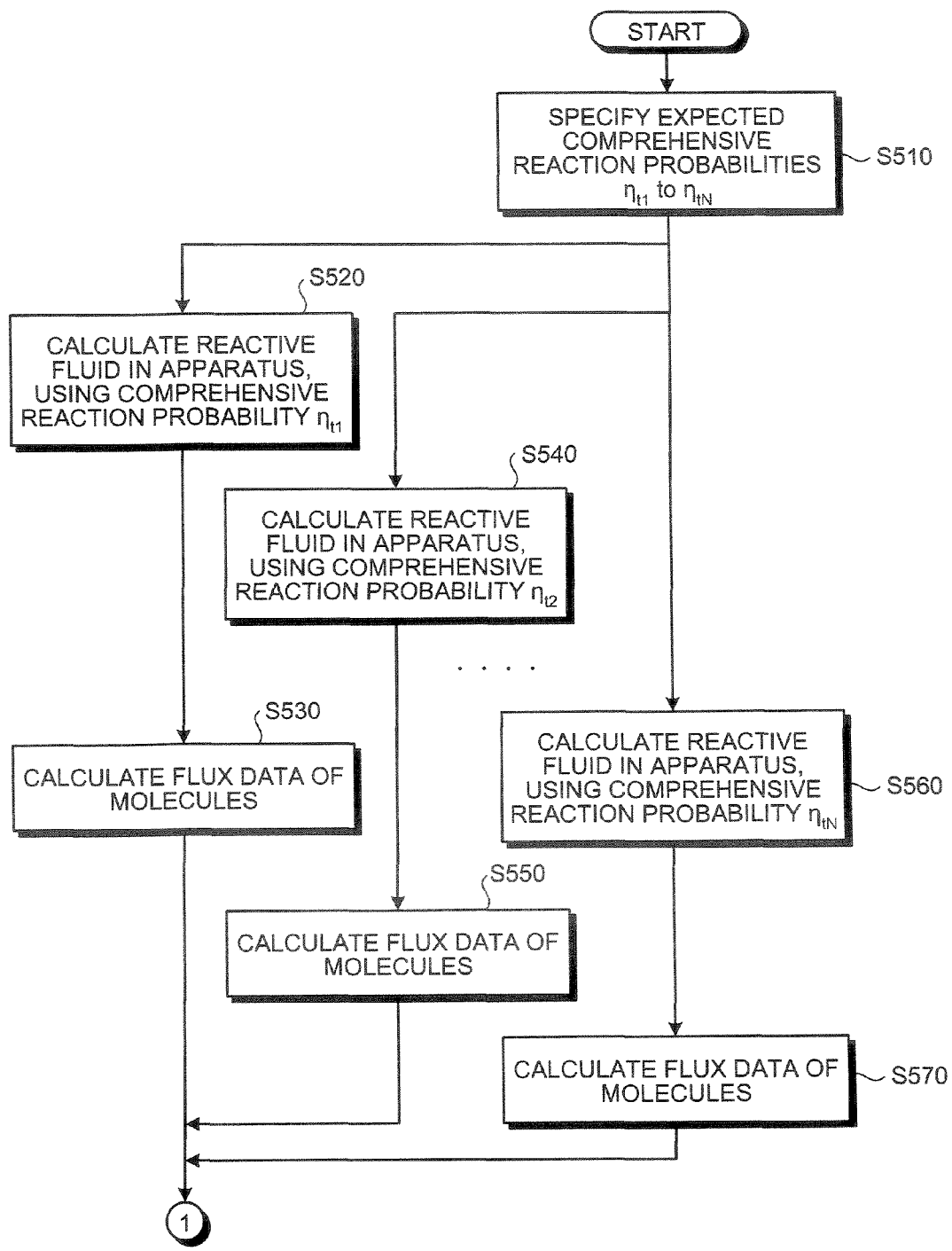
FIG. 22 is a flowchart of a first part of a processing procedure in a profile simulation that is performed by using simulation results.
Figure 23:
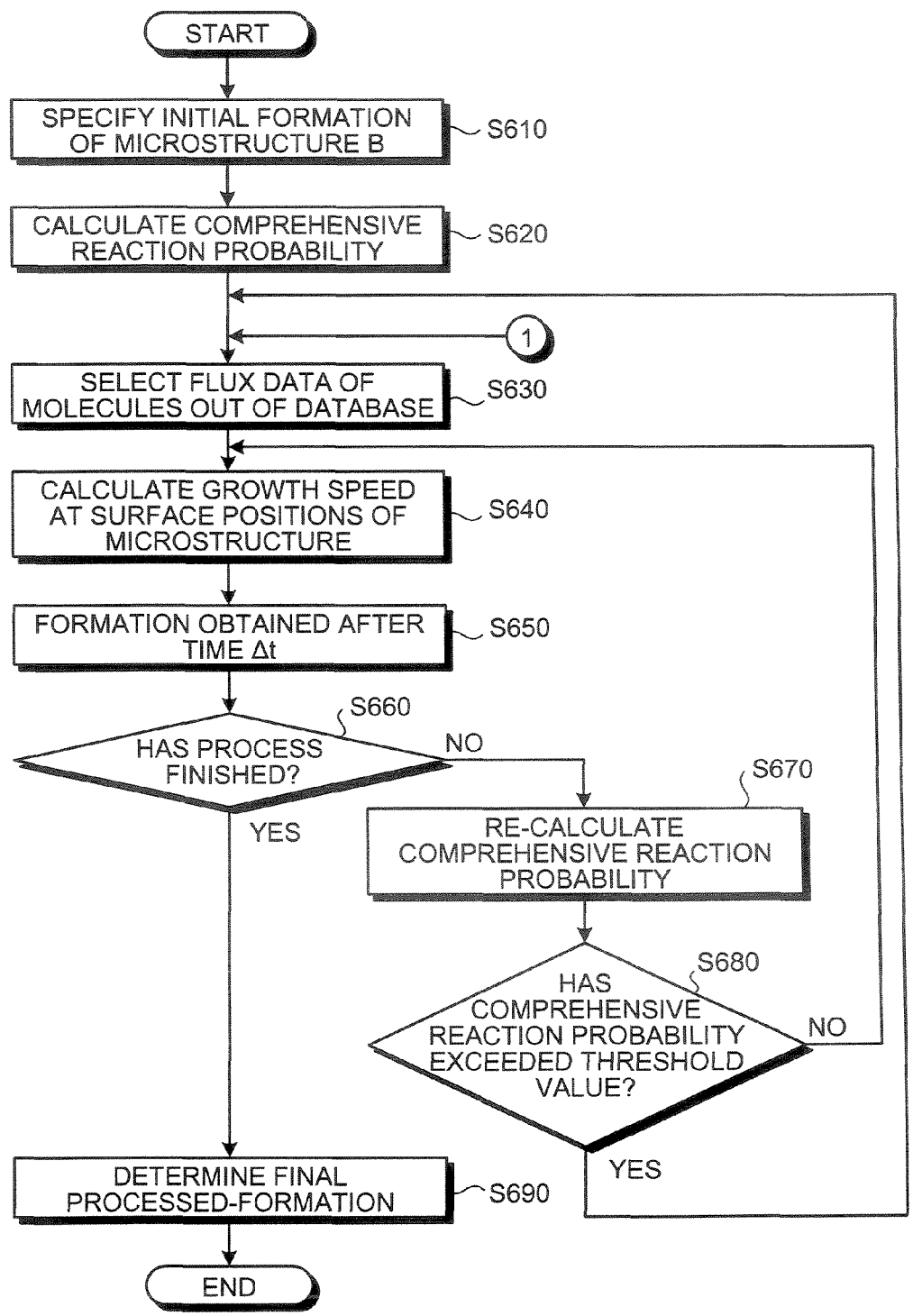
FIG. 23 is a flowchart of a second part of the processing procedure in the profile simulation that is performed by using the simulation results.

A fifth embodiment of the present invention will be explained, with reference to FIG. 22 and FIG. 23. The elements that are the same as those in any of the first through fourth embodiments will be referred to by using the same reference numerals, and the explanation thereof will be omitted. According to the fifth embodiment, an apparatus simulation is performed after a plurality of comprehensive reaction probabilities are hypothetically specified in advance and the results of the simulation are stored into a database. A profile simulation is performed using the simulation results stored in the database.

According to the fifth embodiment, when the surface structure of a wafer changes due to progress in a reaction, comprehensive reaction probabilities that correspond to the changes in the surface structure are re-calculated, as necessary. An apparatus simulation and a profile simulation are performed while the re-calculated comprehensive reaction probability is brought into the reactive fluid simulation in the apparatus, as feedback.

According to the fourth embodiment, the comprehensive reaction probability is calculated based on the existing surface, and the calculated comprehensive reaction probability is used as the boundary condition in the apparatus simulation. As additional inprofile, in a profile simulation, it is possible to speculate, with a predetermined level of precision, the amount of change in a comprehensive reaction probability because there is a processed-profile that is aimed at. In addition, even if the actual microstructures on the surface are mutually different, if the comprehensive reaction probabilities are the same, it is possible to use the same result from an apparatus simulation. In other words, it is possible to perform an apparatus simulation with a reverse approach.

According to the fifth embodiment, a profile simulation is performed, using simulation results from an apparatus simulation that have been stored in the database. More specifically, according to the fifth embodiment, as an approach that is the reverse of the approach used in the fourth embodiment, an amount of change in the comprehensive reaction probability that is to be brought into the apparatus simulation as feedback is specified in advance, and the results of the apparatus simulation are stored in a library. With this arrangement, when the actual surface has reached the comprehensive reaction probability that has been specified in advance due to progress in the processing process or the like, it is also possible to continue the processed-profile simulation or the like while a corresponding result from the apparatus simulation is automatically selected.

The processing procedure in a profile simulation that is performed by using simulation results that have been stored will be explained with reference to FIG. 22 and FIG. 23. First, a plurality of comprehensive reaction probabilities that correspond to the initial profile of the microstructure B, the reaction chamber, the reaction conditions, and the like are specified into the control unit 10. The comprehensive reaction probabilities in this example may be specified based on a simulation history in the past or may be hypothetically specified by the user. The plurality of comprehensive reaction probabilities ($\eta_{t1}$ to $\eta_{tn}$, where n is a natural number) that correspond to the initial profile of the microstructure B, the reaction chamber, the reaction conditions, and the like and that are expected to be used in an apparatus simulation are specified (step S510).

The control unit 10 performs a simulation (i.e. a calculation) on the reactive fluid in the apparatus, using one of the specified comprehensive reaction probabilities, namely $\eta_{t1}$ (step S520), and calculates a vapor phase concentration that corresponds to the surface structure of the wafer 31. The control unit 10 then calculates flux data by converting the vapor phase concentration on the virtual plane A into fluxes of the chemical species (step S530). The flux data of the chemical species on the virtual plane A that has been calculated by the control unit 10 is stored into a predetermined database (i.e. the RAM 17).

Then, the control unit 10 calculates a reactive fluid in the apparatus, using another one of the specified comprehensive reaction probabilities, namely $\eta_{t2}$ (step S540) and calculates a vapor phase concentration that corresponds to the surface structure of the wafer 31. The control unit 10 then calculates flux data by converting the vapor phase concentration on the virtual plane A into fluxes of the chemical species (step S550). The flux data of the chemical species on the virtual plane A that has been calculated by the control unit 10 is stored into the predetermined database (i.e. the RAM 17).

Further, the control unit 10 calculates a reactive fluid in the apparatus, using another one of the specified comprehensive reaction probabilities, namely $\eta_{tn}$ (step S560) and calculates a vapor phase concentration that corresponds to the surface structure of the wafer 31. The control unit 10 then calculates flux data by converting the vapor phase concentration on the virtual plane A into fluxes of the chemical species (step S570). The flux data of the chemical species on the virtual plane A that has been calculated by the control unit 10 is stored into the predetermined database (i.e. the RAM 17). As a result, the control unit 10 stores, into the database (i.e. the RAM 170), the pieces of flux data of the chemical species on the virtual plane A that correspond to all of the specified comprehensive reaction probabilities, namely $\eta_{t1}$ to $\eta_{tn}$.

Subsequently, the control unit 10 starts an apparatus simulation and a profile simulation. The apparatus simulation and the profile simulation in this situation are performed using the same procedure as the procedure explained in the description of the fourth embodiment.

More specifically, a value with which the comprehensive reaction probability used in the apparatus simulation stops corresponding to the surface profile having changes is specified into the control unit 10 as a predetermined threshold value. Next, the control unit 10 specifies inprofile (i.e. an initial profile) related to the microstructure B on which a profile simulation is to be performed (step S610). Further, the control unit 10 calculates a comprehensive reaction probability that corresponds to the initial profile of the microstructure B (step 620).

The control unit 10 extracts, out of the database, a piece of flux data of the chemical species that corresponds to the comprehensive reaction probability calculated at step S620 (step S630). The control unit 10 then performs a profile simulation, based on the reactive fluid simulation in the apparatus, and calculates a growth speed at each of surface positions of the microstructure (step S640). Further, the control unit 10 calculates the profile on the surface of the wafer obtained after the time Δt, based on the growth speeds at the surface positions of the microstructure (step S650).

Subsequently, the control unit 10 performs the same processing as the processing explained in the description of the fourth embodiment. More specifically, the processing performed at steps S660 to S690 corresponds to the processing performed at steps S460 to S490 explained in the description of the fourth embodiment.

In this situation, if the comprehensive reaction probability that is re-calculated in the processing at step S680 has exceeded the predetermined threshold value (step S680: Yes), the control unit 10 extracts, out of the database, a piece of flux data of the chemical species that corresponds to the comprehensive reaction probability calculated at step S670 and performs a simulation on the reactive fluid in the apparatus (step S630).

According to the fifth embodiment, the flux data of the chemical species that corresponds to the comprehensive reaction probabilities are calculated by the control unit 10 in advance. However, the flux data of the chemical species that corresponds to the comprehensive reaction probabilities do not have to be calculated by the control unit 10. The flux data may be stored in a database in advance as predetermined speculated values.

Furthermore, according to the fifth embodiment, the flux data of the chemical species that corresponds to the comprehensive reaction probabilities are stored in the database in advance. However, another arrangement is acceptable in which when an apparatus simulation is performed, the flux data of the chemical species that corresponds to the comprehensive reaction probabilities are input by the user via the input unit 11.

As described above, according to the fifth embodiment, the plurality of comprehensive reaction probabilities are specified in advance, and also an apparatus simulation that corresponds to the comprehensive reaction probabilities is performed so that the simulation results are stored into the database serving as a library. Thus, it is possible to use the simulation results efficiently. Accordingly, it is possible to reduce the calculation load in the profile simulation by a large amount. In addition, it is also possible to perform the profile simulation rapidly and very efficiently.

When the simulation apparatus 1 includes a plurality of CPUs so that an apparatus simulation is performed using the CPUs, it is possible to perform, in parallel, apparatus simulations in which a plurality of comprehensive reaction probabilities that are speculated in advance are used. Thus, it is possible to shorten the time required for the entire simulation.

Consequently, according to the fifth embodiment, it is possible to perform a simulation in which the mutual interaction between two phenomena having mutually different scales is taken into consideration, in a short calculation time period.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for performing a simulation, comprising:
a microprocessor coupled to a memory,
wherein the microprocessor is programmed to perform the simulation by:
calculating a comprehensive reaction probability, for which an influence of a surface structure of a semiconductor device is taken into account, the comprehensive reaction probability being either one of a reaction probability between a chemical species and the semiconductor device and a deactivation probability of the chemical species, the comprehensive reaction probability being assumed to be nondependent upon a concentration of the chemical species; and
performing a simulation of a physical phenomenon occurring in a reaction chamber by using the comprehensive reaction probability as a boundary condition;
wherein the calculating either one of a reaction probability between a chemical species and a semiconductor device and a deactivation probability of the chemical species includes recalculating either one of the reaction probability and the deactivation probability based on the processed-profile, and
the performing the simulation of the physical phenomenon includes performing the simulation of the physical phenomenon based on the recalculated either one of the reaction probability and the deactivation probability, when an amount of change of the recalculated either one of the reaction probability and the deactivation probability exceeds a predetermined threshold value.

2. A non-transitory computer readable medium including computer readable program codes embodied in the medium that when executed by a computer cause the computer to execute:
calculating a comprehensive reaction probability, for which an influence of a surface structure of a semiconductor device is taken into account, the comprehensive reaction probability being either one of a reaction probability between a chemical species and the semiconductor device and a deactivation probability of the chemical species, the comprehensive reaction probability being assumed to be nondependent upon a concentration of the chemical species; and
performing a simulation of a physical phenomenon occurring in a reaction chamber by using the comprehensive reaction probability as a boundary condition;
wherein the calculating either one of a reaction probability between a chemical species and a semiconductor device and a deactivation probability of the chemical species includes recalculating either one of the reaction probability and the deactivation probability based on the processed-profile, and
the performing the simulation of the physical phenomenon includes performing the simulation of the physical phenomenon based on the recalculated either one of the reaction probability and the deactivation probability, when an amount of change of the recalculated either one of the reaction probability and the deactivation probability exceeds a predetermined threshold value.

3. A simulation method comprising:
calculating, using a microprocessor, a comprehensive reaction probability, for which an influence of a surface structure of a semiconductor device is taken into account, the comprehensive reaction probability being either one of a reaction probability between a chemical species and the semiconductor device and a deactivation probability of the chemical species, the comprehensive reaction probability being assumed to be nondependent upon a concentration of the chemical species; and
performing, using the microprocessor, a simulation of a physical phenomenon occurring in a reaction chamber by using the comprehensive reaction probability as a boundary condition;
wherein the calculating either one of a reaction probability between a chemical species and a semiconductor device and a deactivation probability of the chemical species includes recalculating either one of the reaction probability and the deactivation probability based on the processed-profile, and the performing the simulation of the physical phenomenon includes performing the simulation of the physical phenomenon based on the recalculated either one of the reaction probability and the deactivation probability, when an amount of change of the recalculated either one of the reaction probability and the deactivation probability exceeds a predetermined threshold value.

4. The apparatus according to claim 1, wherein
the calculating includes (i) calculating a vapor phase concentration by performing a reactive fluid simulation, and (ii) calculating flux data regarding a flux of the chemical species on a virtual plane that is set above a surface of the semiconductor device by converting the calculated vapor phase concentration into fluxes of the chemical species; and the performing the simulation of the physical phenomenon includes performing a simulation related to a processed-profile of the semiconductor device based on the calculated flux data.

5. The apparatus according to claim 4, wherein
the calculating the flux data further includes calculating the flux data regarding the flux of the chemical species corresponding to a predetermined either one of the reaction probability and the deactivation probability, and storing the flux data of calculation in the memory, in advance; and the performing the simulation of the physical phenomenon includes performing the simulation related to the processed-profile of the semiconductor device based on the stored flux data.

6. The apparatus according to claim 4, wherein
the calculating the flux data includes extracting a surface area of the semiconductor device having a size equal to or larger than a calculation mesh size for calculating the flux data, and calculating either one of the reaction probability and the deactivation probability in the extracted surface area.

7. The apparatus according to claim 4, wherein
the simulation is for a plurality of semiconductor device areas that have different structures on a wafer surface.

8. The apparatus according to claim 7, wherein
the calculating either one of a reaction probability between a chemical species and the semiconductor device and a deactivation probability of the chemical species includes calculating either one of the reaction probability and the deactivation probability in each of the semiconductor device areas, and the performing the simulation of the physical phenomenon includes performing the simulation of the physical phenomenon by calculating an average value of either one of the reaction probabilities and the deactivation probabilities in an area formed with the semiconductor device areas, based on an area size ratio of each of the semiconductor device areas and either one of the reaction probabilities and the deactivation probabilities calculated in each of the semiconductor device areas.

9. The apparatus according to claim 1, wherein
the performing the simulation of the physical phenomenon includes performing the simulation of the physical phenomenon based on the recalculated either one of the reaction probability and the deactivation probability, when the predetermined threshold value is set in advance for a predetermined chemical species that has an influence on the processed-profile of the semiconductor device alone, and when an amount of change of the recalculated either one of the reaction probability and the deactivation probability exceeds the predetermined threshold value.

* * * * *